United States Patent
Lee et al.

(10) Patent No.: US 9,804,762 B2
(45) Date of Patent: Oct. 31, 2017

(54) METHOD OF DISPLAYING FOR USER INTERFACE EFFECT AND ELECTRONIC DEVICE THEREOF

(71) Applicant: Samsung Electronics Co., Ltd., Suwon-si, Gyeonggi-do (KR)

(72) Inventors: Ho Young Lee, Seoul (KR); Soo Jung Bae, Seoul (KR); Min Hee Lee, Seoul (KR); Hye Ryoung Choi, Gwangmyeong-si (KR); Chul Ho Jang, Seoul (KR); Ha Young Kim, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 14/721,365

(22) Filed: May 26, 2015

(65) Prior Publication Data

US 2015/0339047 A1      Nov. 26, 2015

(30) Foreign Application Priority Data

May 26, 2014   (KR) ........................ 10-2014-0063100

(51) Int. Cl.
*G06F 3/048* (2013.01)
*G06F 3/0485* (2013.01)
*G06F 3/0481* (2013.01)
*G06F 1/16* (2006.01)

(52) U.S. Cl.
CPC ............ *G06F 3/0485* (2013.01); *G06F 1/165* (2013.01); *G06F 3/0481* (2013.01); *G06F 2200/1614* (2013.01); *G06F 2203/04803* (2013.01)

(58) Field of Classification Search
CPC ..... G06F 2200/1614; G06F 2200/1637; G06F 1/1694
See application file for complete search history.

(56) References Cited

U.S. PATENT DOCUMENTS

| | | | |
|---|---|---|---|
| 7,978,176 B2 * | 7/2011 | Forstall ................ | G06F 1/1626 345/158 |
| 8,634,184 B2 | 1/2014 | Kim et al. | |
| 8,634,674 B2 | 1/2014 | Hanechak | |
| 8,634,876 B2 | 1/2014 | Friedman et al. | |
| 8,896,632 B2 * | 11/2014 | MacDougall ......... | G06F 1/1626 345/173 |
| 2009/0067753 A1 | 3/2009 | Hanechak | |
| 2010/0042954 A1 * | 2/2010 | Rosenblatt ........... | G06F 1/1626 715/863 |
| 2010/0070926 A1 * | 3/2010 | Abanami .............. | G06F 1/1626 715/835 |
| 2010/0079355 A1 * | 4/2010 | Kilpatrick, II ....... | G06F 1/1616 345/1.3 |
| 2010/0105370 A1 | 4/2010 | Kruzeniski et al. | |
| 2010/0105439 A1 | 4/2010 | Friedman et al. | |

(Continued)

*Primary Examiner* — Omar Abdul-Ali
(74) *Attorney, Agent, or Firm* — Jefferson IP Law, LLP

(57) ABSTRACT

An electronic device is provided. The electronic device includes a first display and a second display, a display module configured to display a first display screen on the first display and a second display screen on the second display, a sensing module configured to detect an event corresponding to a rotation of the electronic device, and a processor configured to respectively determine whether to rotate each of a plurality of objects included in the first display screen based on the event.

20 Claims, 23 Drawing Sheets

(56) References Cited

U.S. PATENT DOCUMENTS

| | | | |
|---|---|---|---|
| 2011/0193783 A1 | 8/2011 | Kim et al. | |
| 2012/0084738 A1* | 4/2012 | Sirpal | G06F 1/1616 715/863 |
| 2012/0324400 A1* | 12/2012 | Caliendo, Jr. | G06F 9/4443 715/835 |
| 2013/0080931 A1* | 3/2013 | Sirpal | G06F 3/1438 715/761 |
| 2013/0162684 A1* | 6/2013 | Williams | G09G 5/363 345/650 |
| 2014/0132636 A1 | 5/2014 | Hanechak | |
| 2015/0128075 A1* | 5/2015 | Kempinski | G06F 3/012 715/765 |

* cited by examiner

METHOD OF DISPLAYING FOR USER INTERFACE EFFECT AND ELECTRONIC DEVICE THEREOF

CROSS-REFERENCE TO RELATED APPLICATION(S)

This application claims the benefit under 35 U.S.C. §119(a) of a Korean patent application filed on May 26, 2014 in the Korean Intellectual Property Office and assigned Serial number 10-2014-0063100, the entire disclosure of which is hereby incorporated by reference.

TECHNICAL FIELD

The present disclosure relates to an electronic device and a user interface (UI) effect displayed on a display of the electronic device.

BACKGROUND

With the current development of digital technology, various electronic devices capable of communicating with other devices and processing personal information while moving are being released, including mobile communication terminals, personal digital assistants (PDAs), electronic organizers, smartphones, and tablet personal computers (PCs). Such electronic devices do not stay in their typical original areas and reach mobile convergence covering other terminals' areas.

Typically, electronic devices may include a call function such as a voice call and a video call, a messaging function such as Short Message Service (SMS)/Multimedia Message Service (MMS), an E-mail sending and receiving function, an organizer function, a capturing function, a TV playback function, a video playback function, a music playback function, an Internet access function, an instant messaging function, and a social networking service (SNS) function.

Moreover, as a user interface (UI) or user experience (UX) technology of an electronic device develops, various effects for application execution and screen switching are provided.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of displaying a predetermined user interface (UI) effect based on an event detected by an electronic device and the electronic device thereof.

In accordance with an aspect of the present disclosure, an electronic device is provided. The electronic device includes a first display and a second display, a display module configured to display a first display screen on the first display and a second display screen on the second display, a sensing module configured to detect an event corresponding to a rotation of the electronic device, and a processor configured to respectively determine whether to rotate each of a plurality of objects included in the first display screen based on the event.

In accordance with another aspect of the present disclosure, a method of displaying a user interface (UI) effect is provided. The method includes displaying a first display screen on a first display and a second display screen on a second display, detecting an event corresponding to a rotation of the electronic device, and respectively determining whether to rotate each of a plurality of objects included in the first display screen based on the event.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
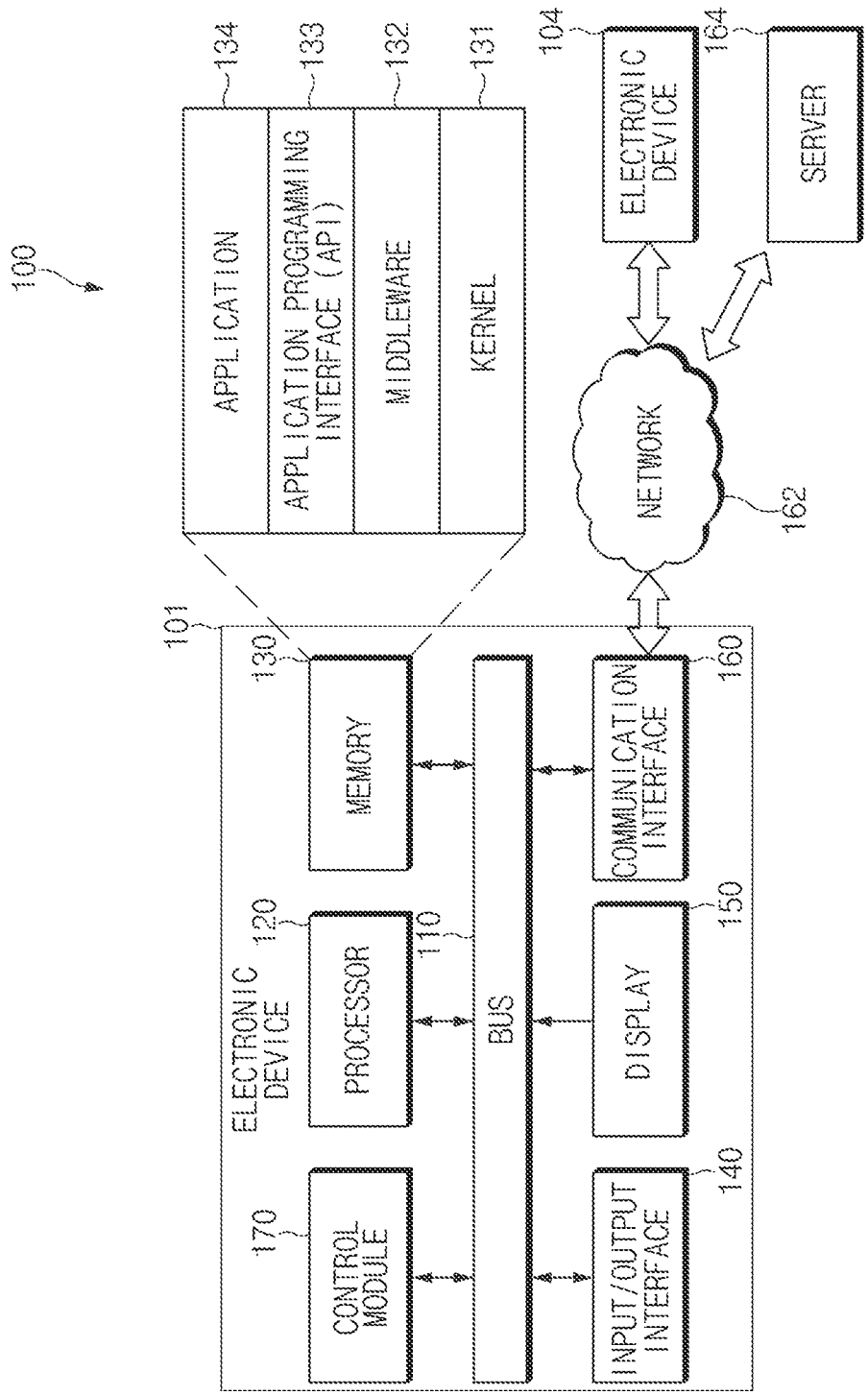
FIG. 1 is a block diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," "including," or "comprising," specifies a property, a region, a fixed number, a process, an element and/or a component but does not exclude other properties, regions, fixed numbers, processes, elements and/or components. The meaning of "include," "comprise," "including," or "comprising," specifies a property, a region, a fixed number, a process, an element and/or a component but does not exclude other properties, regions, fixed numbers, processes, elements and/or components.

In this specification, the expression "or" includes any or all combinations of words listed. For example, "A or B" may include A or include B or include both A and B.

The terms 'first' and/or 'second' may be used to describe various elements; however, the elements should not be limited by these terms. Such terms do not limit the order and/or priority of the elements. The expressions are used to distinguish one component from another component. For instance, both "a first electronic device" and "a second electronic device" are all electronic devices but indicate different electronic devices. For example, a first component may be referred to as a second component and vice versa without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Terms used in this specification are used to describe specific embodiments, and are not intended to limit the scope of the present disclosure. The terms of a singular form may include plural forms unless they have a clearly different meaning in the context.

Unless otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

An electronic device according to various embodiments of the present disclosure may be a device displaying user interface (UI) effects to be described with reference to FIGS. 1 to 13. For example, an electronic device may include at least one of smartphones, smart pads, tablet personal computers (PCs), mobile phones, video phones, e-book readers, desktop PCs, laptop PCs, netbook computers, personal digital assistants (PDAs), portable multimedia players (PMPs), MP3 players, mobile medical equipment, cameras, or wearable devices (for example, head-mounted-devices (HMDs) such as electronic glasses, electronic clothing, electronic bracelets, electronic necklaces, appcessories, electronic tattoos, or smartwatches).

According to various embodiments of the present disclosure, an electronic device may be smart home appliances displaying UI effects to be described with reference to FIGS. 1 to 13. The smart home appliances may include at least one of, for example, televisions, digital video disc (DVD) players, audios, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, and electronic picture frames.

According to an embodiment of the present disclosure, an electronic device may include at least one of various medical devices displaying UI effects to be described with reference to FIGS. 1 to 13 (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, car head units, industrial or household robots, financial institutions' automatic teller's machines (ATMs), and stores' point of sales (POS).

According to an embodiment of the present disclosure, an electronic device may include at least one of furniture or buildings/structures displaying UI effects to be described with reference to FIGS. 1 to 13, electronic boards, electronic signature receiving devices, projectors, or various measuring instruments (for example, water, electricity, gas, or radio signal measuring instruments). An electronic device according to an embodiment of the present disclosure may be one of the above-mentioned various devices or a combination thereof. Additionally, an electronic device according to an embodiment of the present disclosure may be a flexible device. Furthermore, it is apparent to those skilled in the art that an electronic device according to an embodiment of the present disclosure is not limited to the above-mentioned devices.

Hereinafter, an electronic device according to various embodiments of the present disclosure will be described in more detail with reference to FIGS. 1 to 13. The term "user" in various embodiments may refer to a person using an electronic device or a device using an electronic device (for example, an artificial intelligent electronic device).

FIG. 1 is a block diagram illustrating a network environment including an electronic device according to various embodiments of the present disclosure.

Referring to FIG. 1, the electronic device 101 may include a bus 110, a processor 120, a memory 130, an input/output interface 140, a display 150, a communication interface 160, and a control module 170.

The bus 110 may be a circuit connecting the above-mentioned components to each other and delivering a communication signal (for example, a control message) therebetween.

The processor 120, for example, receives an instruction from the above other components (e.g., the memory 130, the input/output interface 140, the display 150, the communication interface 160, or the control module 170) through the bus 110, interprets the received instruction, and performs operations and data processing in response to the interpreted instruction.

The memory 130 may store an instruction or data received from the processor 120 or other components (e.g., the input/output interface 140, the display 150, the communication interface 160, or the control module 170) or an instruction or data generated from the processor 120 or other components. The memory 130, for example, may include programming modules, for example, a kernel 131, a middleware 132, an application programming interface (API) 133, and an application 134. Each of the above-mentioned programming modules may be configured with software, firmware, hardware, or a combination thereof.

The kernel 131 may control or manage system resources (for example, the bus 110, the processor 132, or the memory 130) used for performing operation or functions implemented by the remaining other programming modules, for example, the middleware 134, the API 120, or the application 130. Additionally, the kernel 131 may provide an interface for accessing an individual component of the electronic device 101 from the middleware 132, the API 133, or the application 134 and controlling or managing the individual component.

The middleware 132 may serve as an intermediary role for exchanging data between the API 133 or the application 134 and the kernel 131 through communication. Additionally, in relation to job requests received from the applications 132, the middleware 134 may perform a control (for example, scheduling or load balancing) for the job requests by using a method of assigning a priority for using a system resource (for example, the bus 101, the processor 110, or the memory 134) of the electronic device 101 to at least one application among the applications 120.

The API 133, as an interface through which the application 134 controls a function provided from the kernel 131 or the middleware 132, may include at least one interface or function (for example, an instruction) for file control, window control, image processing, or character control.

According to various embodiments of the present disclosure, the application 134 may include a short message service (SMS)/multimedia message service (MMS) application, an e-mail application, a calendar application, an alarm application, a health care application (e.g., an application for measuring an exercise amount or blood sugar), or an environmental information application (e.g., an application for providing pressure, moisture, or temperature information). Additionally or alternatively, the application 134 may be an application relating to information exchange between the electronic device 101 and an external electronic device (e.g., the electronic device 104 or the server 164). The application relating to information exchange, for example, may include a notification relay application for delivering specific information to the external electronic device or a device management application for managing the external electronic device.

The notification relay application may have a function for delivering to an external electronic device (e.g., the electronic device 104 or the server 164) notification information occurring from another application (e.g., an SMS/MMS application, an e-mail application, a health care application, or an environmental information application) of the electronic device 101. Additionally or alternatively, the notification relay application may receive notification information from an external electronic device in the network environment 100 (e.g., the electronic device 104 or the server 164) and may then provide the received notification information to a user. The device management application, for example, may manage (e.g., install, delete, or update) a function (e.g., turning on/off an external electronic device itself (or some components) or adjusting the brightness or resolution of a display) for at least part of an external electronic device (e.g., the electronic device 104 or the server 164) communicating with the electronic device 104, an application operating in the external electronic device, or a service (e.g., a call service or a message service) provided from the external electronic device.

According to various embodiments of the present disclosure, the application 134 may include an application specified according to the attribute (e.g., a type of an electronic device) of the external electronic device (e.g., the electronic device 104 or the server 164). When an external electronic device is an MP3 player, the application 134 may include an application relating to music playback. Similarly, when an external electronic device is a mobile medical device, the application 134 may include an application relating to heath care. According to an embodiment of the present disclosure, the application 134 may include at least one of an application specified to the electronic device 101 or an application received from an external electronic device (for example, the electronic device 104 or the server 164).

The input/output interface 140 may deliver an instruction or data inputted from a user through an input/output device (e.g., a sensor, a keyboard, or a touch screen), to the processor 120, the memory 130, the communication interface 160, or the first data processing module 170 through the bus 110. The input/output interface 140 may provide data on a user's touch inputted through a touch screen to the processor 120. Additionally, the input/output interface 140 may output an instruction or data received from the processor 120, the memory 130, the communication interface 160, or the control module 170 through the bus 110, through the input/output device (e.g., a speaker or a display). For example, the input/output interface 140 may output voice data processed through the processor 120 to a user through a speaker.

The display 150 may display various information (e.g., multimedia data or text data) to a user. Hereinafter, a panel included in the display 150 may be referred to as a screen. At this point, the panel may include a touch panel.

The communication interface 160 may connect a communication between the electronic device 101 and an external device (e.g., the electronic device 104 or the server 106). The communication interface 160 may communicate with the external device in connection to the network 162 through wireless communication or wired communication. The wireless communication may include at least one of wireless fidelity (Wi-Fi), Bluetooth (BT), near field communication (NFC), GPS, or cellular communication (for example, $3^{rd}$ generation (3G), Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)). The wired communication may include at least one of universal serial bus (USB), high definition multimedia interface (HDMI), recommended standard 232 (RS-232), or plain old telephone service (POTS), for example.

According to an embodiment of the present disclosure, the network 162 may be a telecommunications network. The telecommunications network may include at least one of a computer network, internet, internet of things, or telephone network. According to an embodiment of the present disclosure, a protocol (e.g., transport layer protocol, data link layer protocol, or physical layer protocol) for communication between the electronic device 101 and an external device may be supported by at least one of the application 134, the application programming interface 133, the middleware 132, the kernel 131, or the communication interface 160.

The control module 160 may process at least part of information obtained from other components (for example, the processor 120, the memory 130, the input/output interface 140, or the communication interface 1360) and may output a result of the processing to a user through various methods.

The control module 170 may control (determine) UI effects displayed on the electronic device 101 by using the processor 120 or separately. For example, UIs displayed on the electronic device 101 may include a plurality of objects and the control module 170 may separately determine an effect for each of the plurality of objects. Additionally, the control module 170 may determine effects on UI itself displayed on the electronic device 101.

According to an embodiment of the present disclosure, the server 106 may support the driving of the electronic device 101 by performing at least one operation or function implemented in the electronic device 101. For example, the server 106 may include a control server module 108 supporting the control module 170 implemented on the electronic device 101. The control server module 108 may include at least one component of the control module 170 and may perform (e.g., handle) at least one operation among operations that the control module 170 performs.

Figure 2A:
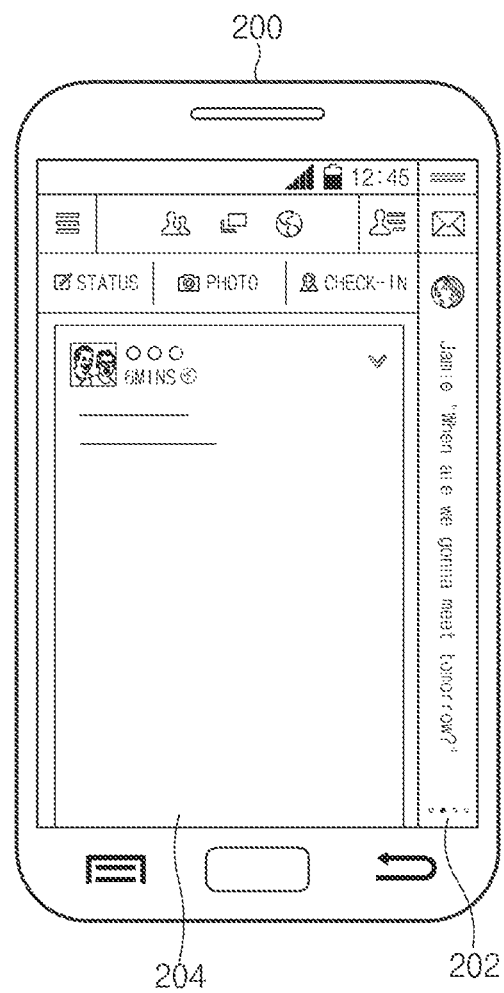
FIG. 2A is a view illustrating a user interface (UI) displayed on a display of an electronic device according to an embodiments of the present disclosure.

FIG. 2A is a view illustrating a UI displayed on a display of an electronic device according to various embodiments of the present disclosure.

Referring to FIG. 2A, the electronic device 200 may include a plurality of displays. The electronic device 200 includes a first display 202 and a second display 204. However, the number of displays included in the electronic device 200 is not limited to two. For example, the electronic device 200 may include three displays. Additionally, the position of a display included in the electronic device 200 is not limited to the front of the electronic device 200 and may be the side or back of the electronic device 200.

Each of the plurality of displays may be separately included in the electronic device 200. According to another embodiment of the present disclosure, each of the plurality of displays may be included in the electronic device 200 as dividing an area in one panel.

When each of the plurality of displays, as an independent panel, is included in the electronic device 200, the electronic device 200 may include a process for each panel additionally. For example, the electronic device 200 may additionally include a graphic processing unit (GPU)) and a frame buffer for the first display 202 and a GPU and a frame buffer for the second display 204. However, according to various embodiments of the present disclosure, the electronic device 200 may include one GPU controlling the first display 202 and the second display 204 separately and a frame buffer.

Referring to FIG. 2A, the electronic device 200 may display a plurality of objects on each of the first display 202 and the second display 204.

According to various embodiments of the present disclosure, a display screen or a plurality of objects displayed on the second display 204 may be displayed based on a horizontal axis regardless of a state in which the second electronic 200 is placed.

According to another embodiment of the present disclosure, a display screen displayed on the first display 202 may be displayed based on different axes by each state in which the electronic device 200 is placed. Additionally, each of a plurality of objects included in an UI displayed on the first display 202 may be displayed based on different axes.

Hereinafter, the case that a text object displayed on the first display 202 is displayed based on a major axis (i.e., a vertical axis of the electronic device 200) in order for readability is described as one example. Additionally, the case that a display screen object displayed on the first display 202 is displayed in a forward direction regardless of a state in which the electronic device 200 is placed is described as one example.

However, a text object and a display screen object and their UI effects displayed on the first display 202 are not limited to the embodiments described with reference to the drawings.

Figure 2B:
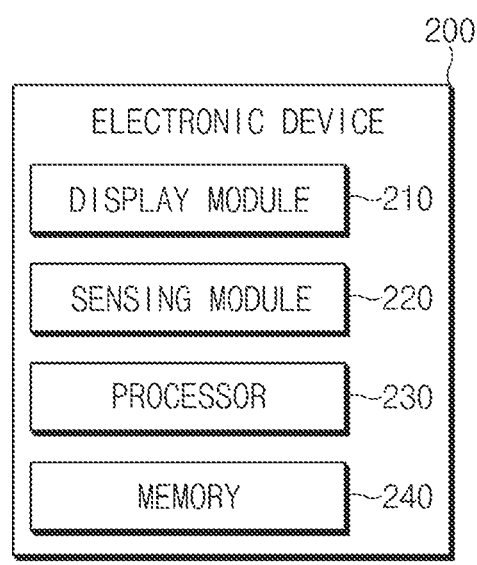
FIG. 2B is a configuration diagram of an electronic device according to an embodiments of the present disclosure.

FIGS. 2A and 2B are configuration diagrams of an electronic device 200 according to various embodiments of the present disclosure.

Referring to FIGS. 2A and 2B, the electronic device 220 includes a display module 210, a sensing module 220, a processor 230, and a memory 240. However, the electronic device 200 shown in FIG. 2B is just at least one of various embodiments of the present disclosure and may vary based on components shown in FIG. 2B.

The electronic device 200 may further include an UI for receiving a certain command or information from a user. In this case, the UI may be an input device such as a keyboard and a mouse typically but may be a graphical user interface (GUI) displayed on a display device.

The display module 210 may display a first display screen on the first display 202 and a second display screen on the second display 204. According to various embodiments of the present disclosure, the display module 210 may include a first display module and a second display module and each display module may display a corresponding display screen on each display. The displayed first display screen or second display screen may include a plurality of objects. The object may include, for example, a text object, an image object, a trick play object controlling the playback of content, and a page indicator object. According to various embodiments of the present disclosure, the trick play object is described based on the image object.

The displayed display module 210 may display an UI effect for the displayed first display screen or second display screen. Additionally, the display module 210 may display an UI effect for each of a plurality of objects included in the first display screen or the second display screen.

The display module 210 may display the UI effect based on various conditions. For example, the display module 210 may display an UI effect for the first display screen, the second display screen, or a plurality of objects based on an event corresponding to the rotation of the electronic device 200.

Figure 13:
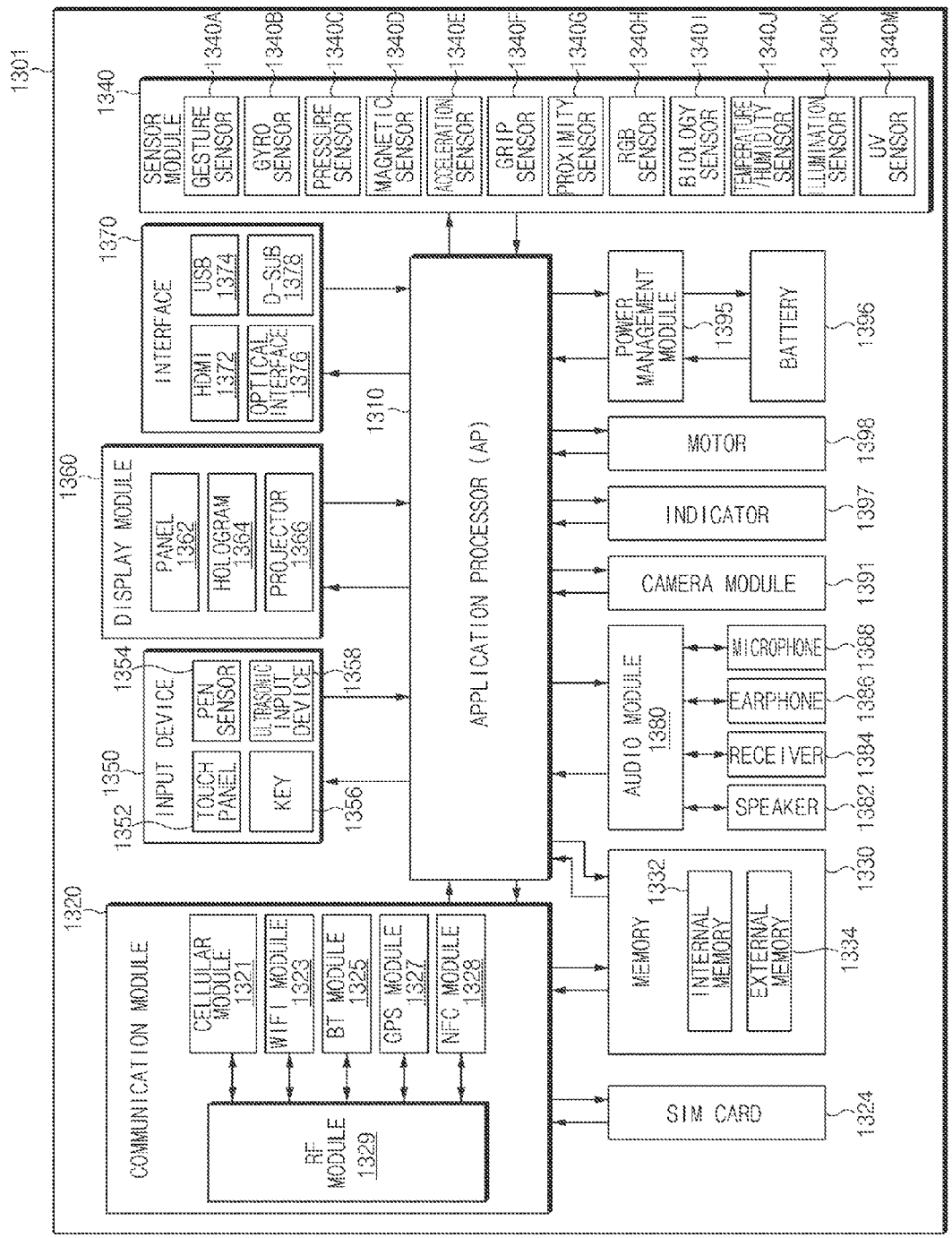
FIG. 13 is a block diagram illustrating an electronic device according to various embodiments of the present disclosure.

The sensing module 220 may detect an event according to a change occurring inside/outside the electronic device 200 by using various sensors (for example, at least one of the sensors 1340A to 1340M of FIG. 13).

The sensing module 220 may detect an event corresponding to the rotation of the electronic device 200. The event corresponding to the rotation of the electronic device 200 may include a rotation event of the electronic device 200 itself and an event of a user's face direction change with respect to the electronic device 200. The sensing module 220 may detect the user's face direction change by detecting an angle formed by the major axis of the first display 202 and the vertical axis including the user's both eyes.

The sensing module 220 may detect a rotation event of the electronic device 200 by using a gesture sensor, a gyro sensor, or an acceleration sensor. Additionally, the sensing module 220 may detect a user's face direction change event for the electronic device 200 by using a red green blue (RGB) sensor or an image sensor.

The processor 230 may separately determine whether to rotate each of a plurality of objects included in the first display screen based on an event corresponding to the rotation of the electronic device 200. Additionally, the processor 230 may determine whether to rotate the first display screen based on the event.

In a similar manner, the processor 230 may determine whether to rotate the second display screen and a plurality of objects included in the second display screen based on the event. In this case, the processor 230 may allow the second display screen to rotate and a plurality of objects included in the second display screen to rotate in the same direction.

However, the processor 230 may determine respectively whether to rotate the first display screen and the second display screen. For example, when the electronic device 200 rotates, the processor 230 does not allow the first display screen to rotate and allows the second display screen to rotate.

When the electronic device 200 disposed in a vertical direction rotates to be disposed in a horizontal direction, the processor 230 allows an image object to rotate and may not allow a text object to rotate. At this point, the image object may rotate 90 degrees in a clockwise direction. According to various embodiments of the present disclosure, the processor 230 may not allow a page indicator to rotate regardless of the event corresponding to the rotation of the electronic device 200.

Additionally, when the electronic device 200 disposed in a vertical direction rotates to be disposed in a horizontal direction, the processor 230 may determine whether to rotate the first display screen based on the rotation direction of the electronic device 200. For example, when the electronic device 200 disposed in a vertical direction rotates clockwise, the processor 230 allows the first display screen to rotate and when the electronic device 200 disposed in a vertical direction rotates counterclockwise, the processor 230 may not allow the first display screen to rotate. In more detail, when the electronic device 200 rotates clockwise, the processor 230 may allow the first display screen to rotate 180 degrees in a clockwise or counterclockwise direction.

Furthermore, the display module 210 may display a rotation effect for at least one of the first display screen, the second display screen, and a plurality of objects as an UI effect on the first display screen or the second display screen based on the rotation determined by the processor 230.

Hereinafter, various embodiments in which the processor 230 determines whether to rotate each of a plurality of objects included in the first display screen and the first display screen will be described with reference to FIGS. 3 to 5.

Figure 3A:
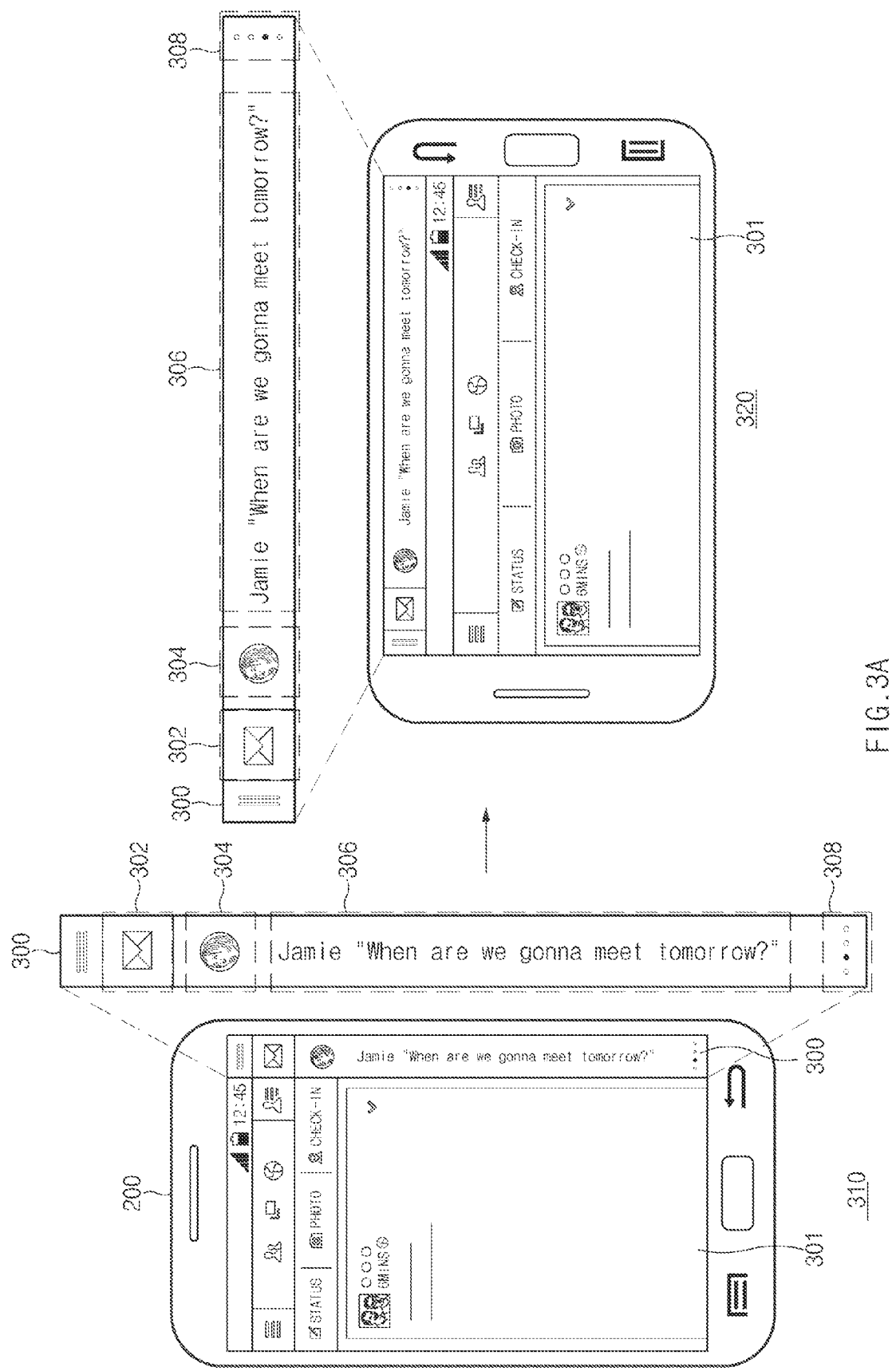
FIGS. 3A, 3B, 3C, and 3D are views illustrating an UI effect displayed on a display of an electronic device according to various embodiments of the present disclosure.
Figure 3B:
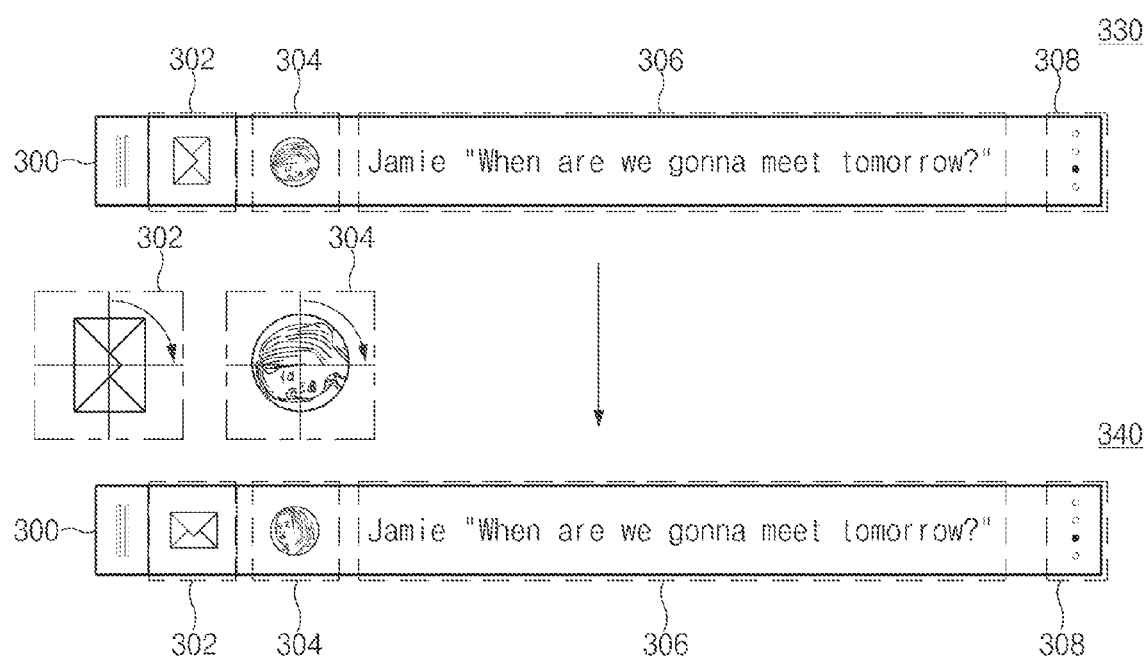
Figure 3C:
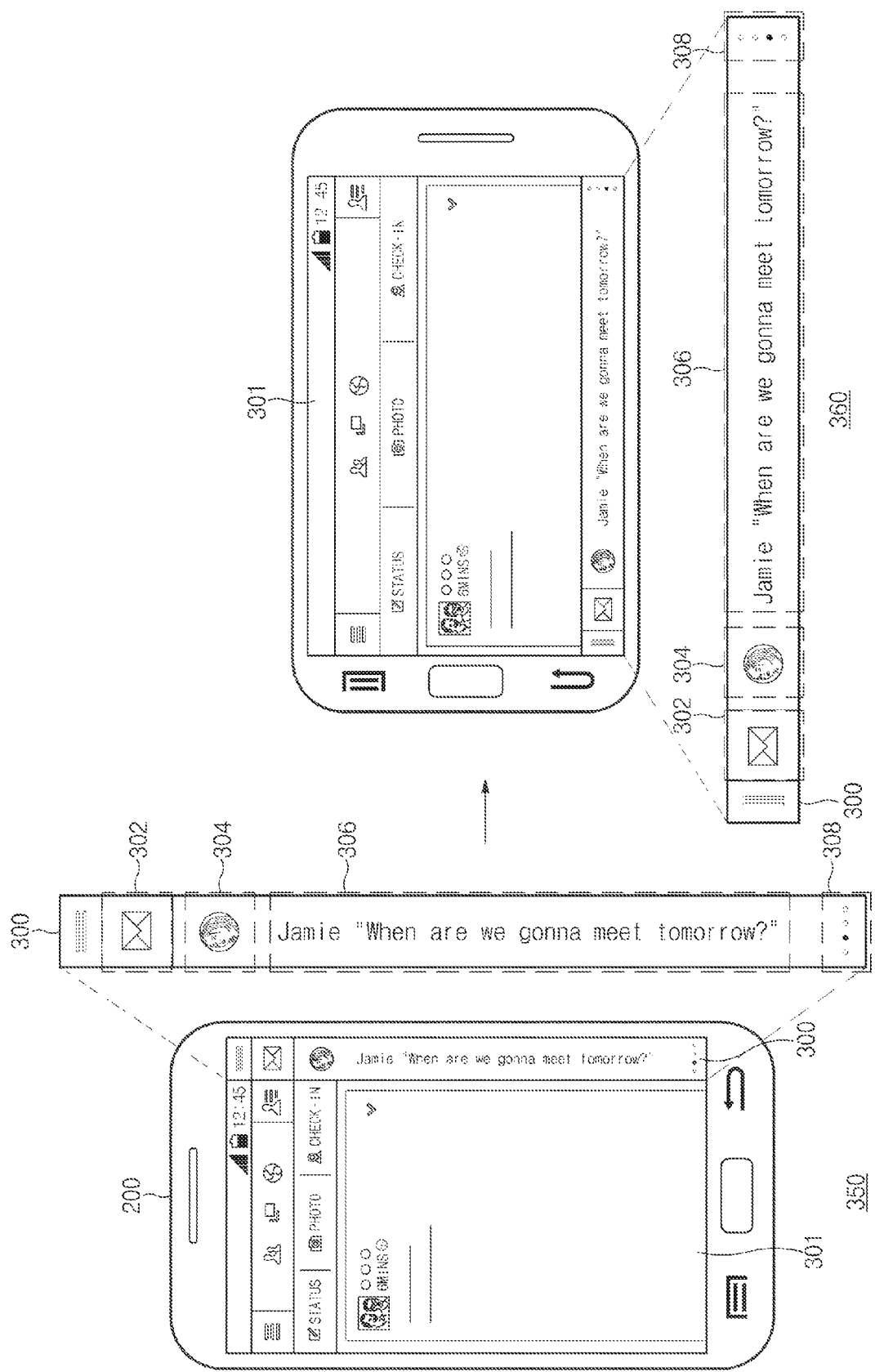

FIGS. 3A, 3B, 3C, and 3D are views illustrating an UI effect displayed on the display of the electronic device 200 according to various embodiments of the present disclosure. Referring to FIGS. 3A to 3C, the electronic device 200 may display a first display screen 300 on the first display 202 and a second display screen 301 on the second display 204. In this case, the first display screen 300 may be an UI displayed on the first display 202 when the electronic device 200 receives a message such as an SMS, an MMS, and an instant message (IM) from another electronic device (for example, the electronic device 104 of FIG. 1).

The first display screen 300 may include a plurality of objects 302 to 308. The first object 302 is an indicator notifying the reception of a message and the second object 304 is a picture of a message sender stored in the electronic device 200. The third object 306 displays part or all of the content of a received message and the fourth object 308 displays a page indicator.

Figure 3D:
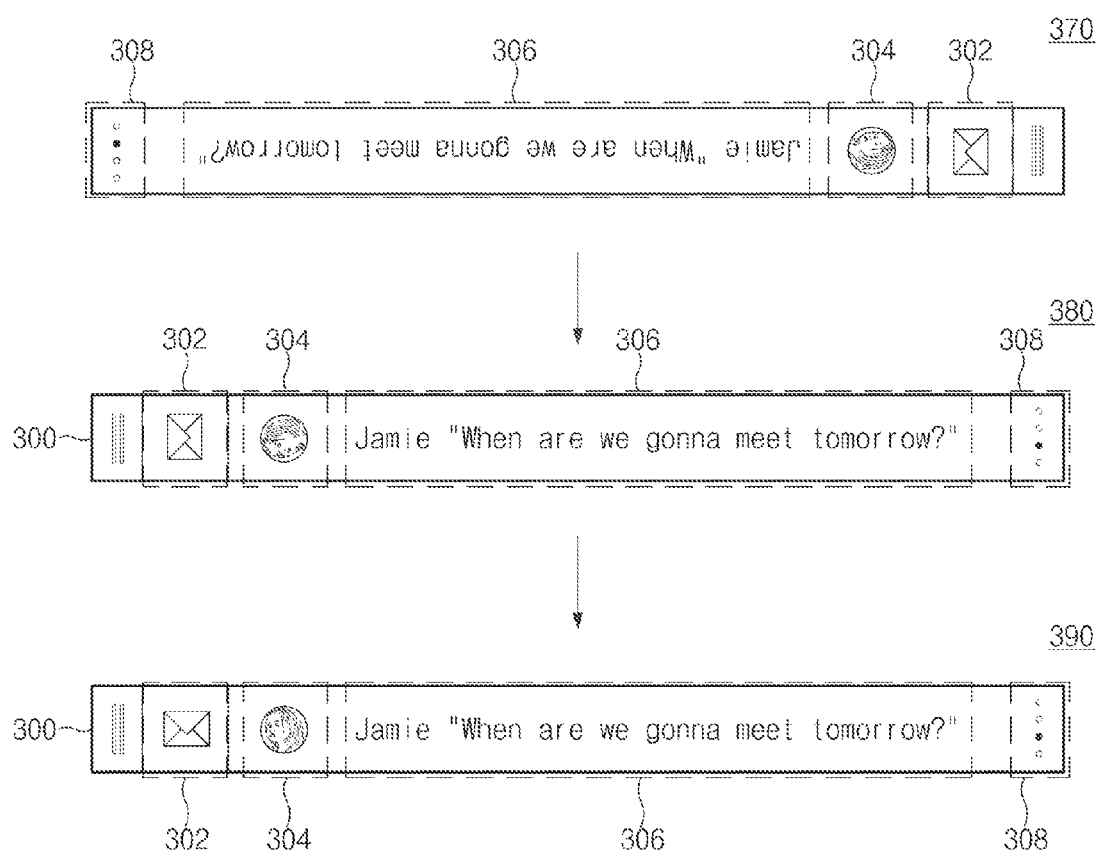

FIGS. 3A and 3C illustrate UI effects according to a rotation direction of the electronic device 200. Additionally, FIGS. 3B and 3D illustrate UI effects for a first display screen among UI effects of FIGS. 3A and 3C.

Referring to FIG. 3A, the electronic device 200 disposed vertically in operation 310 may rotate counterclockwise and may then be disposed horizontally in operation 320. In this case, through operation 310 and operation 320, the first display screen 300 may not rotate but the second display screen 301 may rotate. Additionally, the first object 302 and the second object 304 rotate but the third object 306 and the fourth object 308 does not rotate in the first display screen 300.

Referring to FIG. 3B, the first display screen 300 shown in operation 310 and operation 302 is aligned in the same direction in order to help understanding FIG. 3A. Referring to FIG. 3B, operation 330 corresponds to operations 310 and operation 340 corresponds to operation 320.

Through operation 330 and operation 340, the first object 302 and the second object 304 may rotate as an image object. Additionally, the third object 306 and the fourth object 308 may not rotate as a text object and a page indicator object, respectively.

Referring to FIG. 3C, the electronic device 200 disposed vertically in operation 350 may rotate clockwise and may then be disposed horizontally in operation 360. In this case, through operation 350 and operation 360, the first display screen 300 and the second display screen 301 may rotate. In this case, the first display screen 300 may rotate 180 degrees in a counterclockwise direction and the second display screen 301 may rotate 90 degrees in a counterclockwise direction. Additionally, the first object 302 and the second object 304 rotate but the third object 306 and the fourth object 308 does not rotate in the first display screen 300.

Referring to FIG. 3D, the first display screen 300 shown in operation 350 and operation 360 is aligned in the same direction in order to help understanding FIG. 3C. Referring to FIG. 3D, operation 370 corresponds to operations 350 and operation 390 corresponds to operation 360.

Operation 380 represents that the first display screen 300 in operation 370 rotates 180 degrees in a counterclockwise direction and operation 390 represents that the first object 302 and the second object 304 rotate among a plurality of objects included in the first display screen 300 in operation

380. Operation 380 illustrates an UI effect in which the first display screen 300 in operation 390 changes into the first display screen 300 in operation 390. However, the display screen 300 in operation 380 may be or may not be displayed on the first display 202.

Through operation 370 to operation 390, the first object 302 and the second object 304 may rotate as an image object. Additionally, the third object 306 and the fourth object 308 may not rotate as a text object and a page indicator object, respectively.

Figure 4:
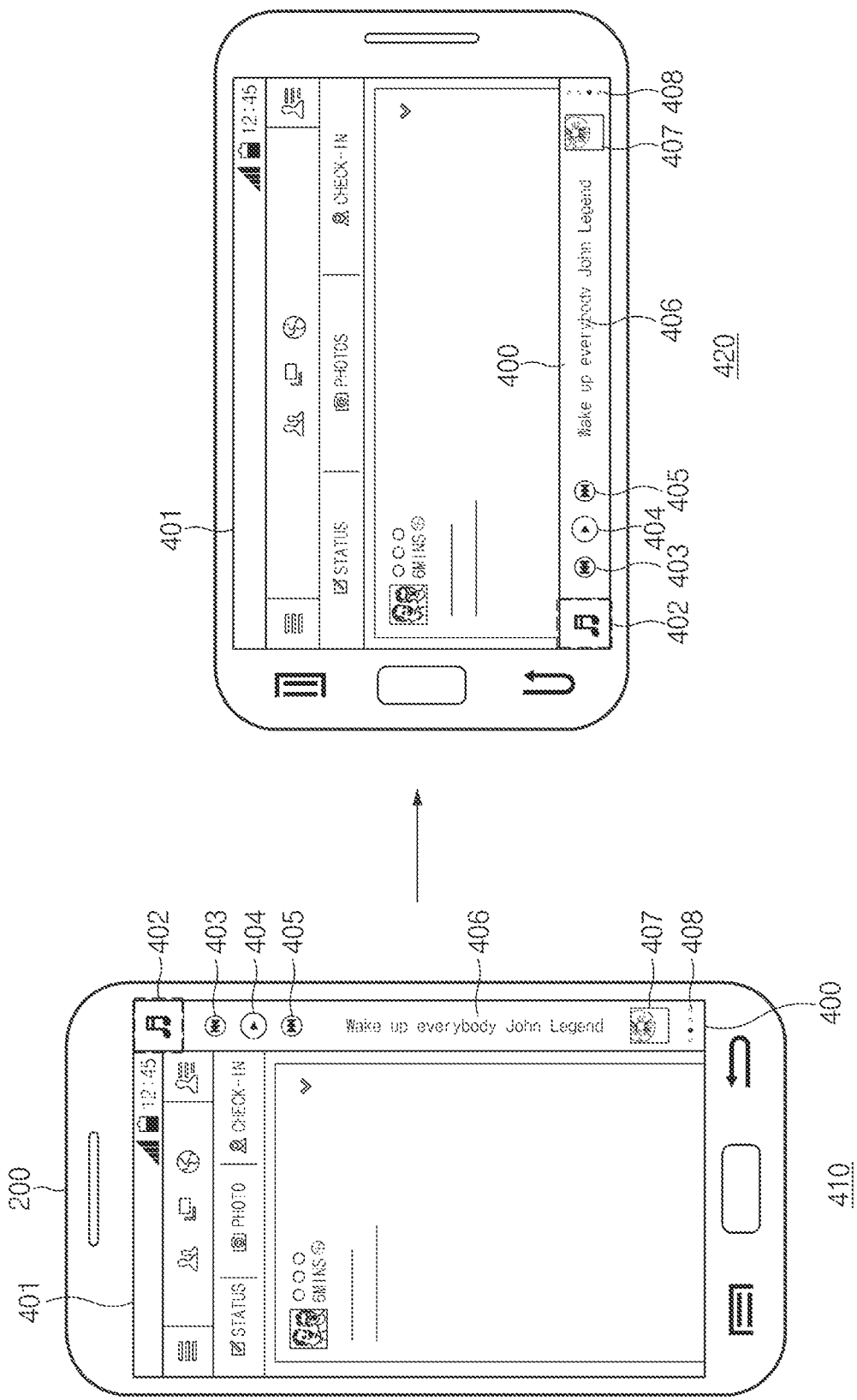
FIG. 4 is a view illustrating a UI effect displayed on a display of an electronic device according to an embodiment of the present disclosure.

FIG. 4 is a view illustrating an UI effect displayed on a display of an electronic device 200 according to another embodiment of the present disclosure. Referring to FIG. 4, the electronic device 200 may display a first display screen 400 on the first display 202 and a second display screen 401 on the second display 204. In this case, when the electronic device 200 uses an application for playing music contents, the first display screen 400 may be an UI for controlling the playback of the music contents.

The first display screen 400 may include a plurality of objects 402 to 408. The first object 402, as an UI category of the first display screen 400, may be an indicator object for the music contents playback application. Each of the second object 403 to the fourth object 405, as a track play object for controlling the playback of the music contents, may be an icon for a previous song playback, a play/pause, and the next song playback. The fifth object 406 may represent the titles and artist names of the music contents and the sixth object 407 may represent an image corresponding to the music contents. The seventh object 408 may represent a page indicator.

Referring to FIG. 4, the electronic device 200 disposed vertically in operation 410 may rotate clockwise and may then be disposed horizontally in operation 420. In this case, through operation 410 and operation 420, the first display screen 400 and the second display screen 401 may rotate. Additionally, the first object 402 to the fourth object 405 and the sixth object 407 may rotate as an image object in the first display screen 400.

Figure 5:
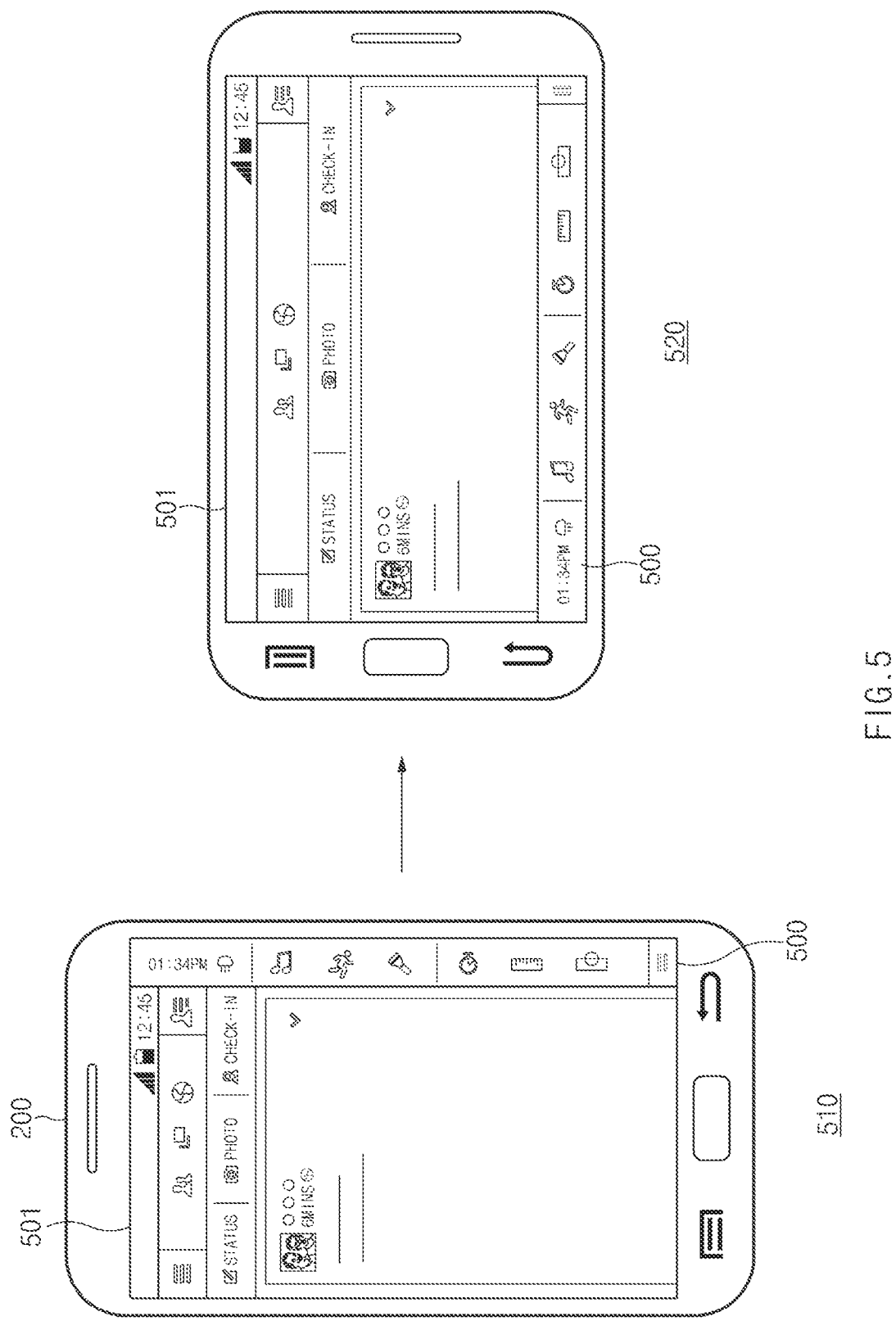
FIG. 5 is a view illustrating a UI effect displayed on a display of an electronic device according to an embodiment of the present disclosure.

FIG. 5 is a view illustrating an UI effect displayed on a display of an electronic device 200 according to another embodiment of the present disclosure. Referring to FIG. 5, the electronic device 200 may display a first display screen 500 on the first display 202 and a second display screen 501 on the second display 204. In this case, the first display screen 500 may be a quick launcher UI where a plurality of favorite applications are registered. In this case, the first display screen 500 may include a current time and a plurality of application icons as objects.

Referring to FIG. 5, the electronic device 200 disposed vertically in operation 510 may rotate clockwise and may then be disposed horizontally in operation 520. In this case, through operation 510 and operation 520, the first display screen 500 and the second display screen 501 may rotate.

A plurality of application icons included in the first display screen 500 may rotate similar to those of FIGS. 3A to 3D, and 4. However, according to various embodiments of the present disclosure, even when the plurality of objects included in the first display screen 500 are image objects, they may not rotate. For example, an UI or object specified not to rotate through a user input may not rotate regardless of an event corresponding to the rotation of the electronic device 200. Or, an arbitrary UI or object may be preset not to rotate in order for readability.

Referring to FIG. 2B again, the display module 210 may display an effect for the first display screen 500 on the first display 202. For example, the display module 210 may display an effect for the first display screen 500 corresponding to the rotation of the electronic device 200 on the first display 202. In this case, an effect for the rotation of the first display screen 500 may be determined by the processor 230.

During the rotation of the electronic device 200, the processor 230 may allow the first display screen 500 to rotate and to be displayed. That is, the processor 230 may allow only the final result where the first display screen 500 rotates to be displayed on the first display 202 and also may allow the rotation effect of the first display screen 500 to be displayed in order for a user to view the rotation of the first display screen 500.

In this case, the processor 230 may allow a rotation angle of the first display screen 500 to be proportional to a rotation angle of the electronic device 200. As described above, when the electronic device 200 disposed in a vertical direction rotates to be disposed in a horizontal direction, the electronic device 200 may rotate 90 degrees but the first display screen 500 may rotate 180 degrees. Accordingly, the processor 230 may allow a rotation angle of the first display screen 500 to be twice a rotation angle of the electronic device 200. However, according to various embodiments of the present disclosure, the processor 230 may allow a rotation angle of the first display screen 500 to be not proportional to a rotation angle of the electronic device 200.

During the rotation of the electronic device 200, the processor 230 may display the first display screen 500 to fade in after fading out. The fading out and fading in mean that the first display screen 500 becomes clear after being blurred. The processor 230 may adjust the sharpness of the first display screen 500 to display the fading out and fading in operations of the first display screen 500.

Additionally, during the rotation of the electronic device 200, the processor 230 may allow the first display screen 500 to be zoomed in after being zoomed out and then to be displayed. The processor 230 may adjust the scale of the first display screen 500 to display the zooming out and zooming in operations of the first display screen 500.

During the rotation of the electronic device 200, the processor 230 may allow the first display screen 500 to rotate based on one axis of the electronic device 200 and to be displayed. Hereinafter, it will be described that the processor 230 allows the first display screen 500 to rotate based on the major axis of the first display screen 500 and to be displayed.

Furthermore, during the rotation of the electronic device 200, the processor 230 may allow the first display screen 500 to scroll in one direction of the first display screen 500 and to be displayed.

The above-mentioned various embodiments may be applied overlapping each other. For example, the first display screen 500 rotates and is displayed while fading in after fading out at the same time.

Additionally, an image object included in the first display screen 500 rotates gradually and is displayed as the first display screen 500 rotates.

Hereinafter, various effects when the first display rotates are described with reference to FIGS. 6A, 6B, 7A, 7B, 8A, 8B, 9A, 9B, 10A, and 10B.

Figure 6A:
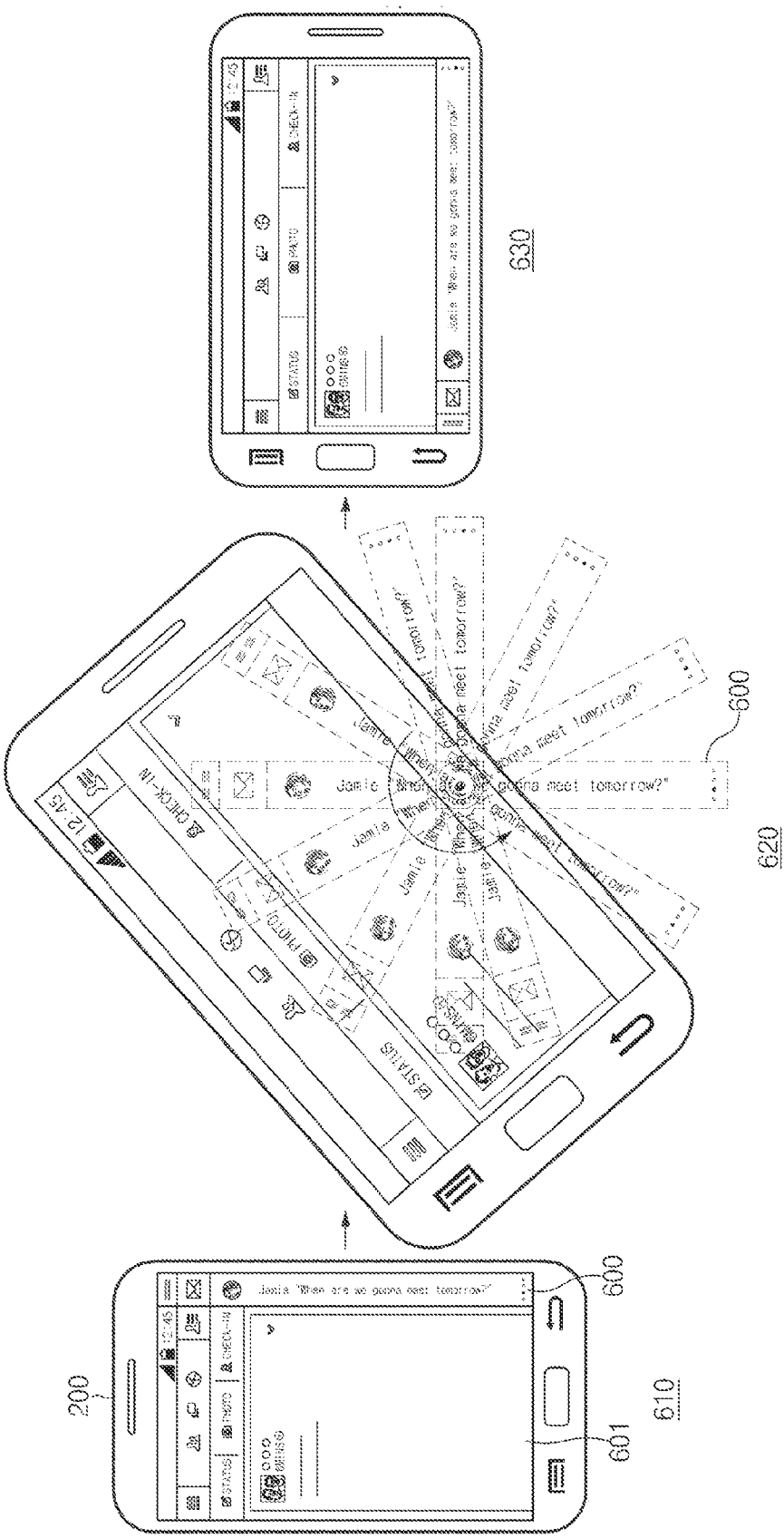
FIGS. 6A and 6B are views illustrating a UI effect for a first display screen displayed on a first display of an electronic device according to an embodiments of the present disclosure.
Figure 6B:
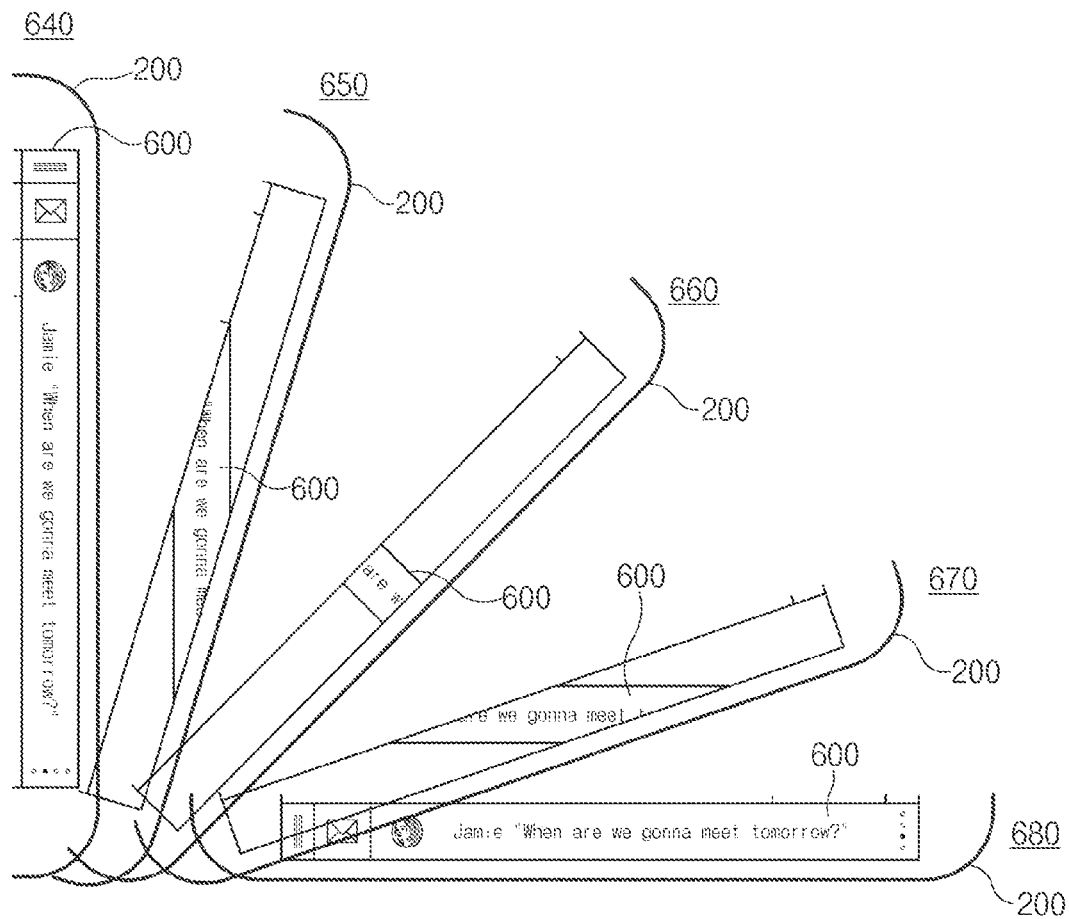

FIGS. 6A and 6B are views illustrating an UI effect for a first display screen 600 displayed on the first display 202 of an electronic device 200 according to various embodiments of the present disclosure.

Referring to FIG. 6A, the electronic device 200 in a vertical state may rotate clockwise and may be disposed in a horizontal state through operations 610 to 630. Operation 620 illustrates an arbitrary point during the rotation of the electronic device 200. The first display screen 600 may rotate 180 degrees in a counterclockwise direction and then may be displayed through operation 610 to operation 630. According to another embodiment of the present disclosure, the first display screen 600 may rotate 180 degrees in a clockwise direction and then may be displayed.

FIG. 6B illustrates a screen effect for the first display screen 600 by dividing operation 610 to operation 630 in order to help understanding FIG. 6A. Referring to FIG. 6B, operation 640 corresponds to operations 610 and operation 680 corresponds to operation 630.

Referring to FIG. 6B, an effect for the first display screen 600 rotates counterclockwise and is displayed through operation 640 to operation 680. A rotation angle of the first display screen 600 may be twice a rotation angle of the electronic device 200. Referring to operation 660, when the electronic device 200 rotates 45 degrees, the first display screen 600 rotates 90 degrees in a counterclockwise direction. Additionally, the border of the first display screen 600 is indicated by a solid line but the solid line is used to identify the first display screen 600. According to various embodiments of the present disclosure, the solid line may be omitted.

Figure 7A:
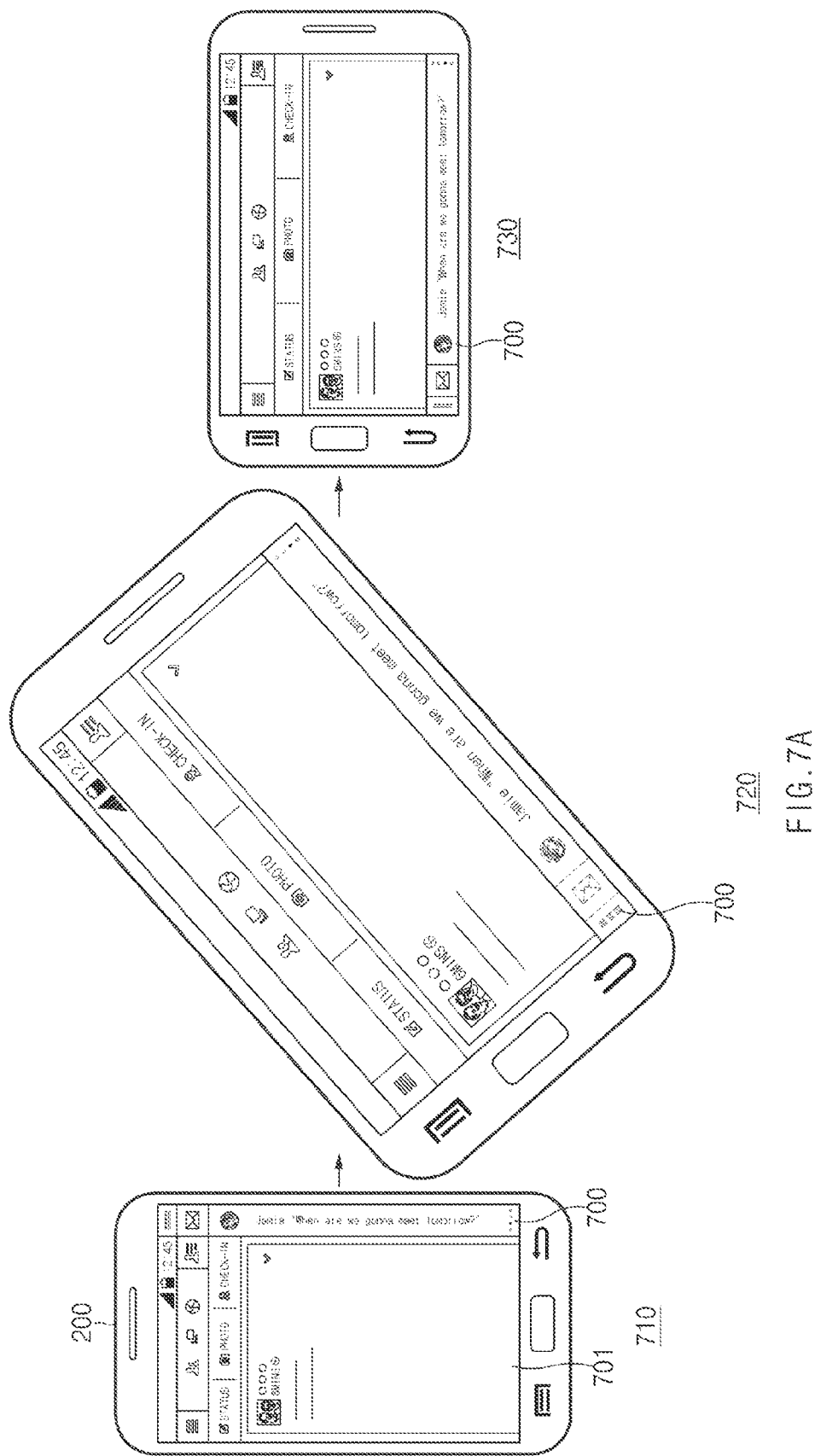
FIGS. 7A and 7B are views illustrating a UI effect for a first display screen displayed on a first display of an electronic device according to an embodiment of the present disclosure.
Figure 7B:
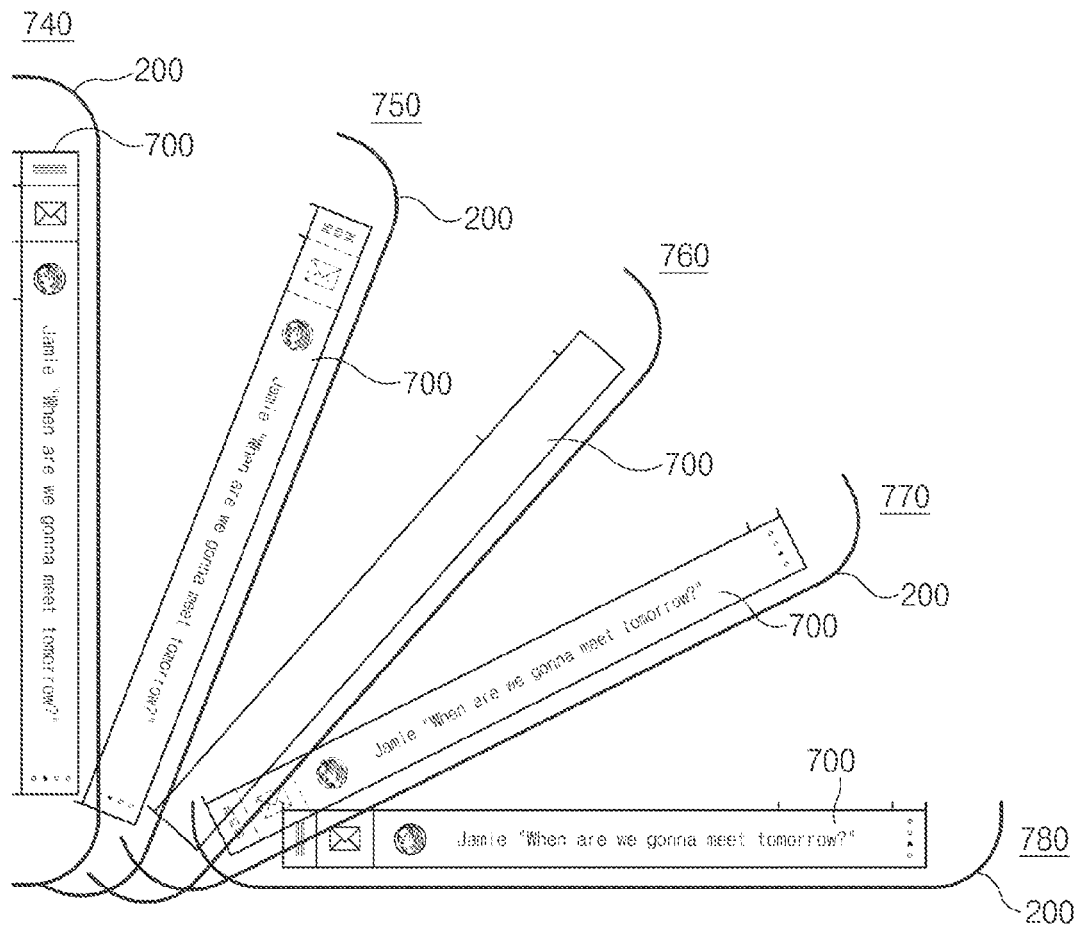

FIGS. 7A and 7B are views illustrating an UI effect for a first display screen 700 displayed on the first display 202 of an electronic device 200 according to another embodiment of the present disclosure.

Referring to FIG. 7A, the electronic device 200 in a vertical state may rotate clockwise and may be disposed in a horizontal state through operations 710 to 730. Operation 720 illustrates an arbitrary point during the rotation of the electronic device 200. The first display screen 700 may fade in after fading out and may be displayed through operation 710 to operation 730.

FIG. 7B illustrates a screen effect for the first display screen 700 by dividing operation 710 to operation 730 in order to help understanding FIG. 7A. Referring to FIG. 7B, operation 740 corresponds to operations 710 and operation 780 corresponds to operation 730.

Referring to FIG. 7B, an effect for the first display screen 700 becomes blurred gradually and then clear and is displayed through operation 740 to operation 780. Referring to operation 760, when the sharpness of the first display screen 700 becomes 0%, the first display screen 700 may be seen as if disappeared. Or, when the transparency of the first display screen 700 becomes 100%, the first display screen 700 may be seen as if disappeared. According to various embodiments of the present disclosure, the sharpness of the first display screen 700 may be set with a threshold value instead of 0%. For example, during the rotation of the electronic device 200, the first display screen 700 may be blurred but displayed without disappearing at an arbitrary point.

Figure 8A:
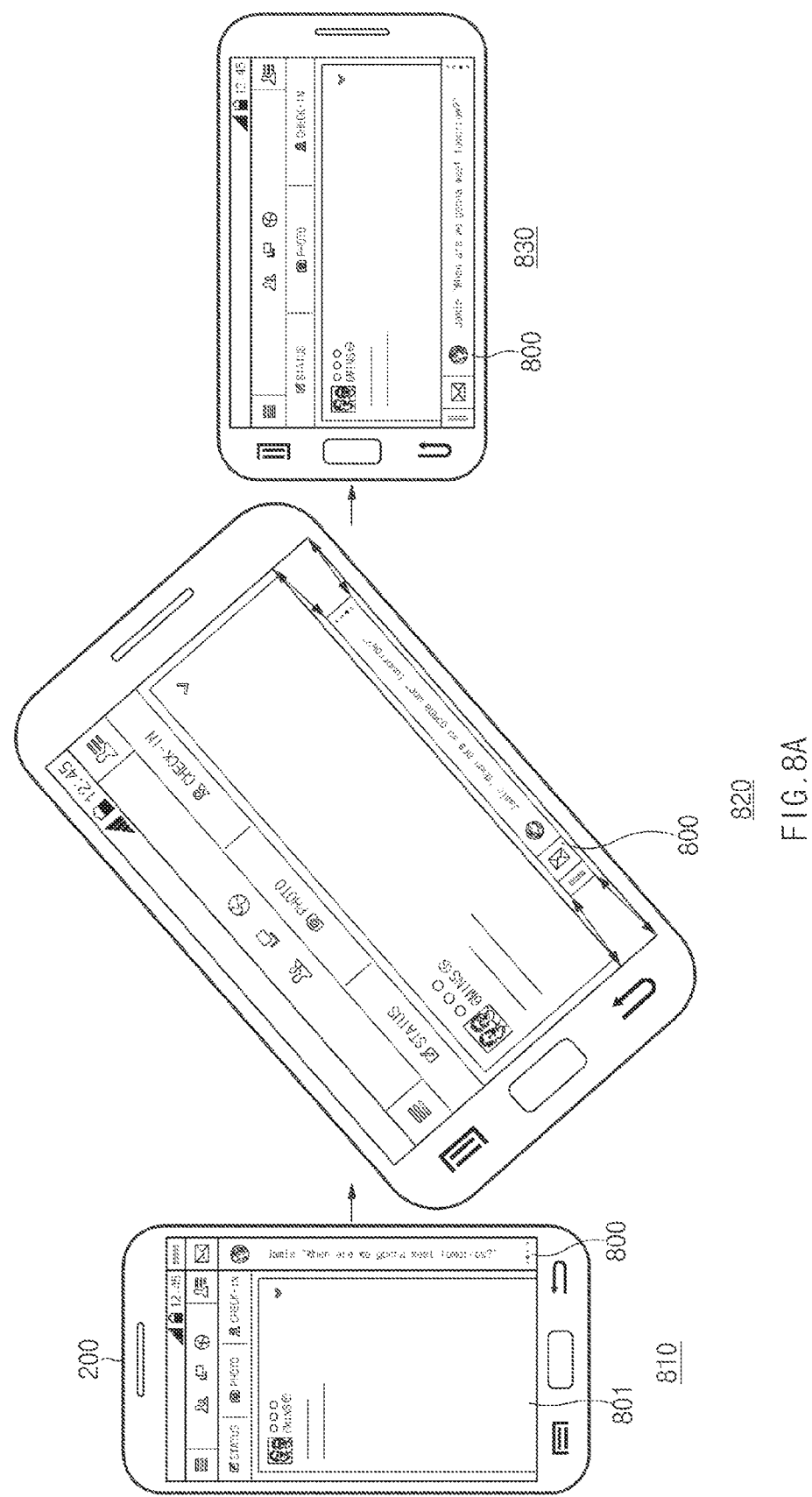
FIGS. 8A and 8B are views illustrating a UI effect for a first display screen displayed on a first display of an electronic device according to an embodiment of the present disclosure.
Figure 8B:
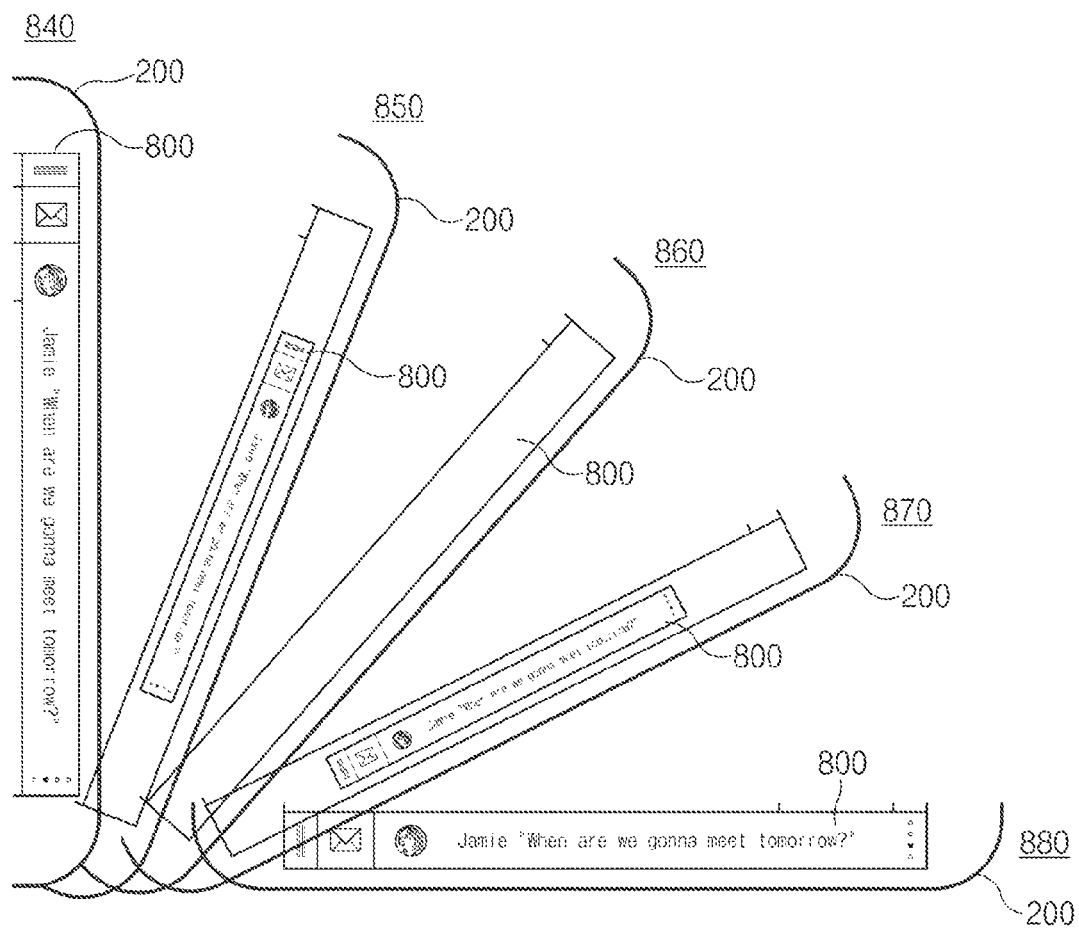

FIGS. 8A and 8B are views illustrating an UI effect for a first display screen 800 displayed on the first display 202 of an electronic device 200 according to another embodiment of the present disclosure.

Referring to FIG. 8A, the electronic device 200 in a vertical state may rotate clockwise and may be disposed in a horizontal state through operations 810 to 830. Operation 820 illustrates an arbitrary point during the rotation of the electronic device 200. The first display screen 800 may be zoomed in after being zoomed out through operation 810 to operation 830.

FIG. 8B illustrates an image effect for the first display screen 800 by dividing operation 810 to operation 830 in order to help understanding FIG. 8A. Referring to FIG. 8B, operation 840 corresponds to operations 810 and operation 870 corresponds to operation 830.

Referring to FIG. 8B, an effect for the first display screen 800 becomes smaller and larger and is displayed through operation 840 to operation 870. Referring to operation 860, when the scale of the first display screen 800 becomes 0%, the first display screen 800 may be seen as if disappeared. According to various embodiments of the present disclosure, the scale of the first display screen 800 may be set with a threshold value instead of 0%. For example, during the rotation of the electronic device 200, the first display screen 800 may be small but displayed without disappearing at an arbitrary point.

Similar to FIG. 6B, a solid line shown at the border of the first display screen 800 is used to identify the first display screen 800. According to various embodiments of the present disclosure, the solid line may be omitted.

Figure 9A:
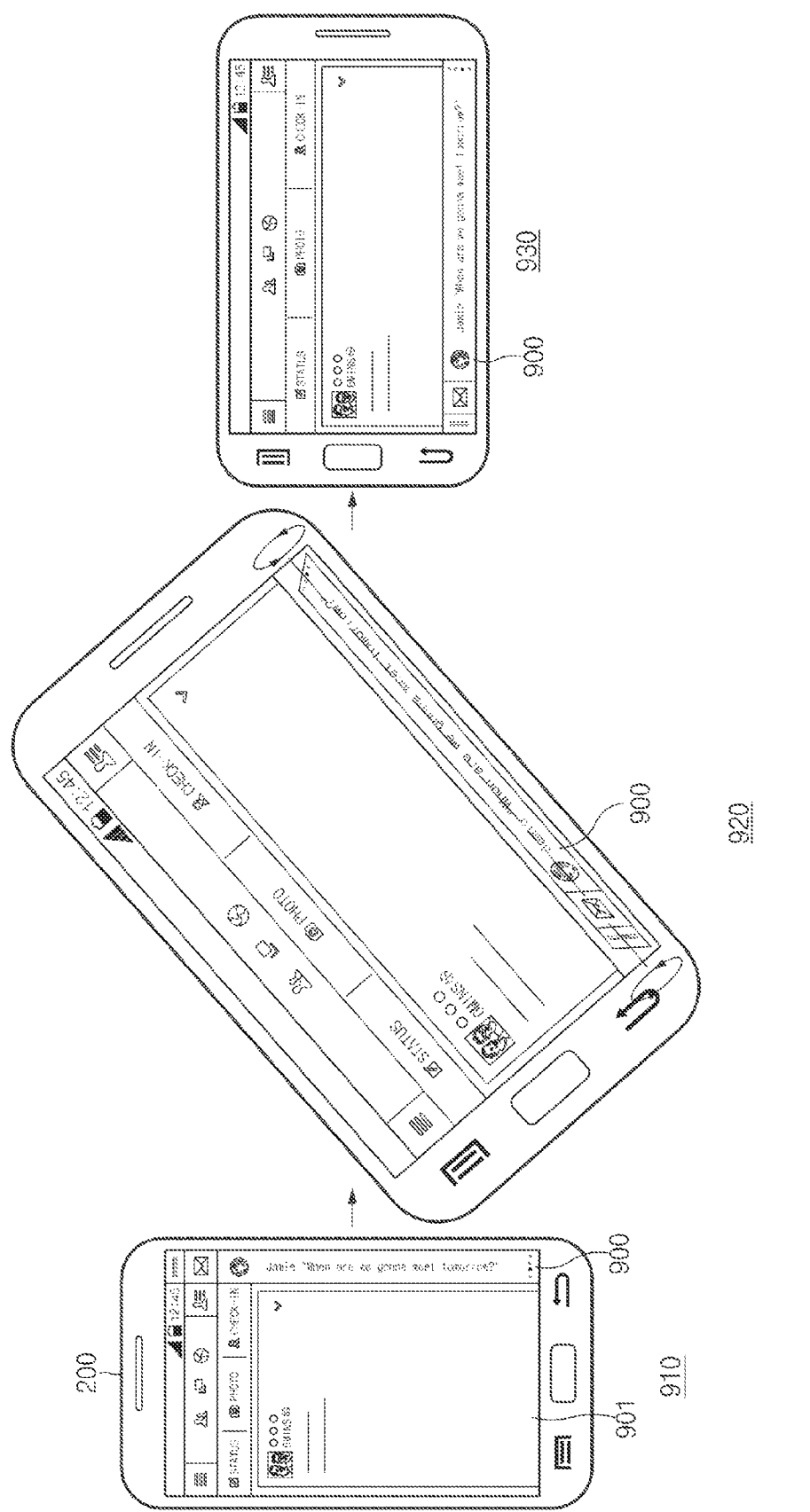
FIGS. 9A and 9B are views illustrating a UI effect for a first display screen displayed on a first display of an electronic device according to an embodiment of the present disclosure.
Figure 9B:
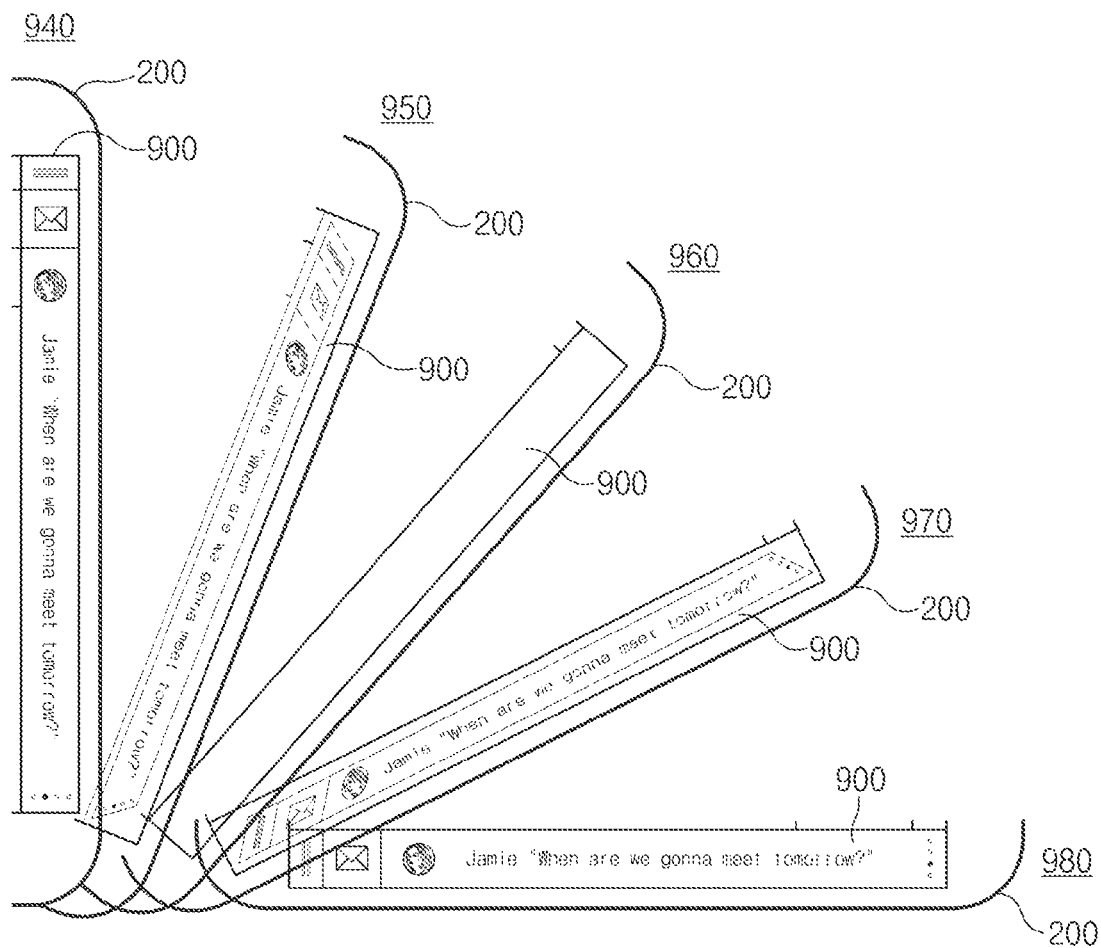

FIGS. 9A and 9B are views illustrating an UI effect for a first display screen 900 displayed on the first display 202 of an electronic device 200 according to another embodiment of the present disclosure.

Referring to FIG. 9A, the electronic device 200 in a vertical state may rotate clockwise and may be disposed in a horizontal state through operations 910 to 930. Operation 920 illustrates an arbitrary point during the rotation of the electronic device 200. The first display screen 900 may rotate based on one axis of the first display screen 900, for example, the major axis, and then may be displayed through operation 910 to operation 930.

FIG. 9B illustrates an image effect for the first display screen 900 by dividing operation 910 to operation 730 in order to help understanding FIG. 9A. Referring to FIG. 9B, operation 940 corresponds to operations 910 and operation 980 corresponds to operation 930.

Referring to FIG. 9B, an effect for the first display screen 900 rotates based on the major axis of the first display screen 900 and then is displayed through operation 940 to operation 980. Referring to operation 960, the first display screen 900 may rotate 90 degrees based on the major axis of the first display screen 900 and may be seen as if disappeared.

Similar to FIG. 6B, a solid line shown at the border of the first display screen 900 is used to identify the first display screen 900. According to various embodiments of the present disclosure, the solid line may be omitted.

Figure 10A:
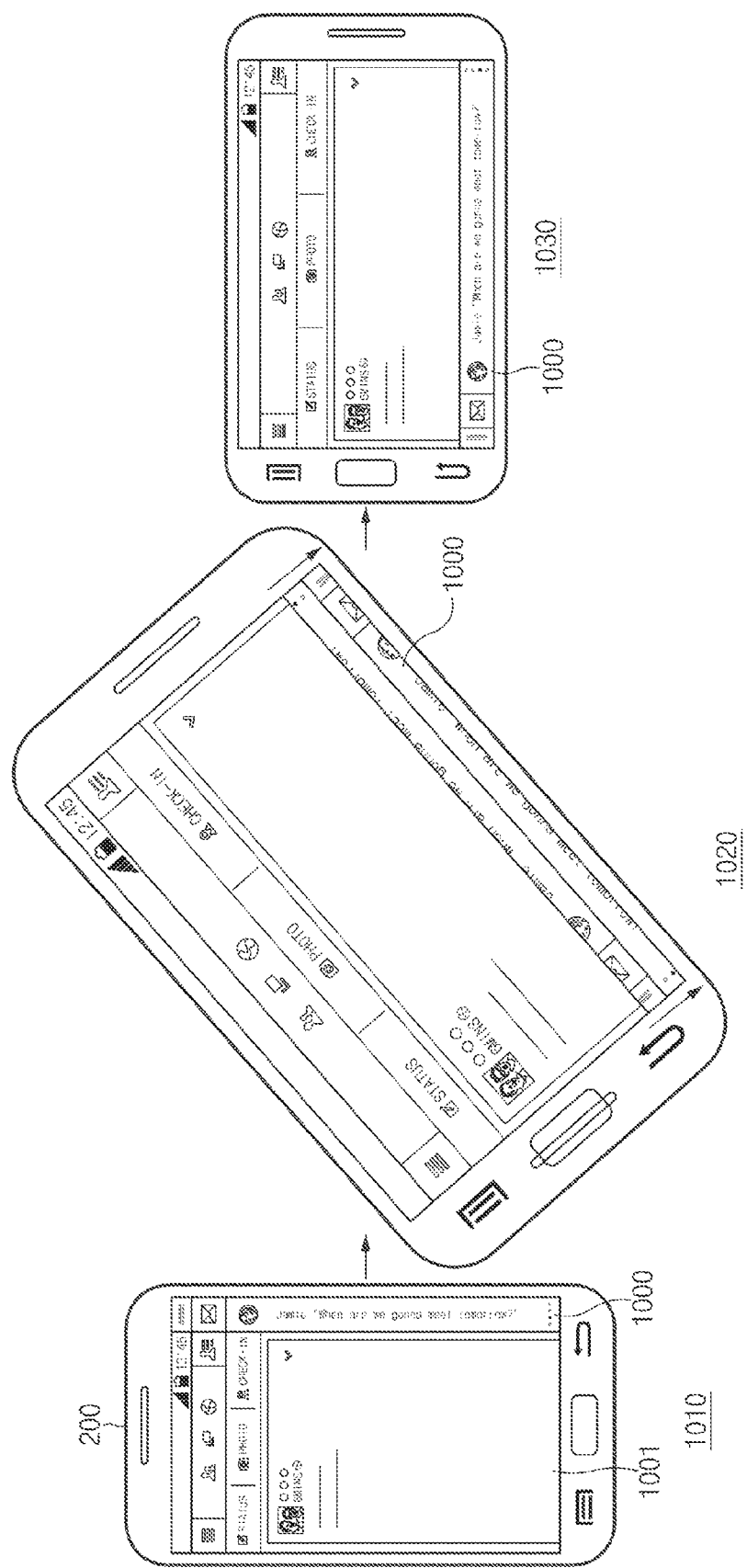
FIGS. 10A and 10B are views illustrating a UI effect for a first display screen displayed on a first display of an electronic device according to an embodiment of the present disclosure.
Figure 10B:
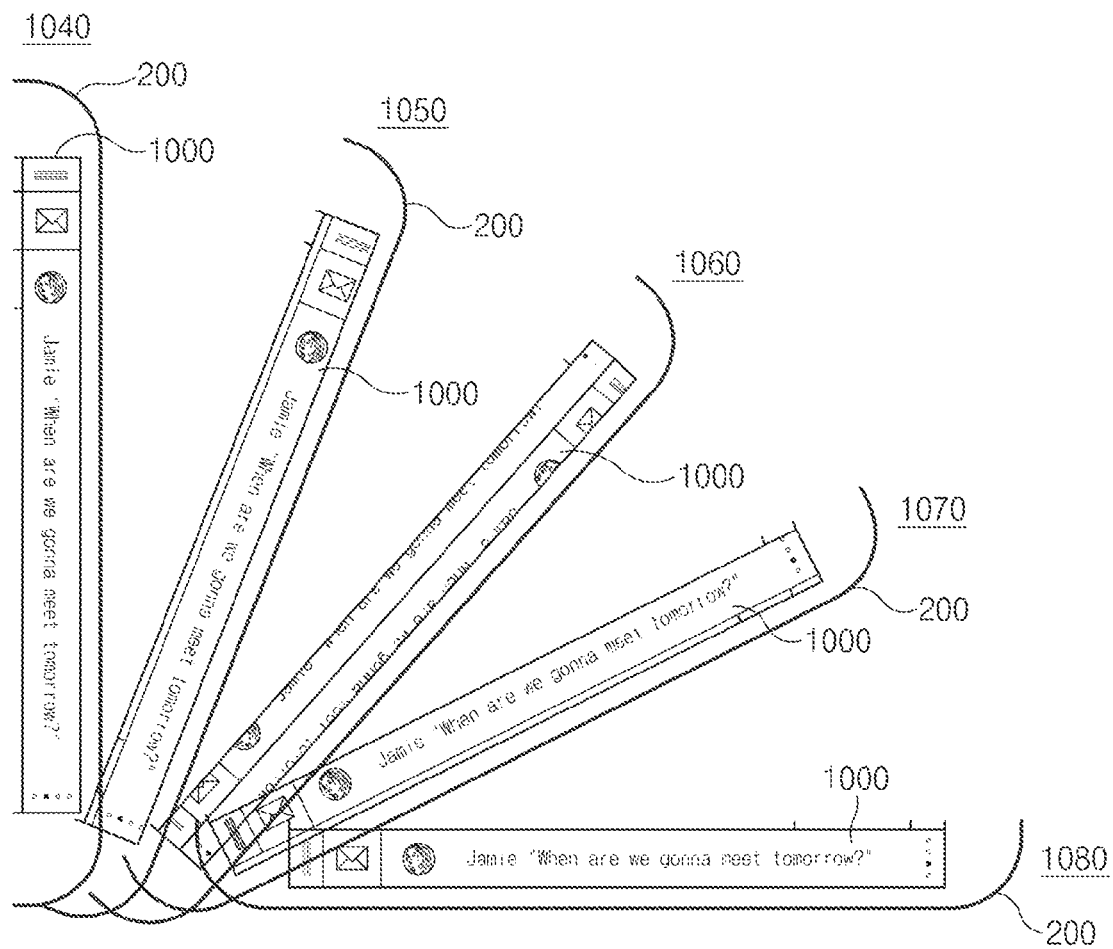

FIGS. 10A and 10B are views illustrating an UI effect for a first display screen 1000 displayed on the first display 202 of an electronic device 200 according to another embodiment of the present disclosure.

Referring to FIG. 10A, the electronic device 200 in a vertical state may rotate clockwise and may be disposed in a horizontal state through operations 1010 to 1030. Operation 1020 illustrates an arbitrary point during the rotation of the electronic device 200. The first display screen 1000 may be scrolled in one direction and then may be displayed through operation 1010 to operation 1030.

FIG. 10B illustrates an image effect for the first display screen 1000 by dividing operation 1010 to operation 1030 in order to help understanding FIG. 10A. Referring to FIG. 10B, operation 1040 corresponds to operations 1010 and operation 1070 corresponds to operation 1030.

Referring to FIG. 10B, an effect for the first display screen 1000 is scrolled in one direction and is displayed through operation 1040 to operation 1070. Referring to operation 1060, the first display screen 1000 is scrolled half in operation 1040 and the first display screen 1000 in operation 1080 is scrolled newly. Referring to FIG. 10B, the boundary between the newly displayed first display screen 1000 and the scrolled first display screen 1000 may not be displayed.

Referring to FIGS. 6A, 6B, 7A, 7B, 8A, 8B, 9A, 9B, 10A, and 10B, an image object included in a first display screen while the electronic device 200 rotates represents an image object in a state where the electronic device 200 is disposed vertically and an image object in a state where the electronic device 200 is disposed horizontally. However, an image object according to various embodiments of the present disclosure rotates and is displayed in correspondence to the rotation of the electronic device 200. Furthermore, like the effect for the first display screen, the image object may rotate and then may be displayed or may fade in after fading out and then may be displayed. Additionally, the image object may be zoomed in after being zoomed out and may then be displayed, may rotate based on one axis of the image object and then may be displayed, or may be scrolled and displayed.

Referring to FIG. 2B, the memory 240 may store data. At this point, data stored in the memory 240 include data inputted/outputted between components inside the electronic device 200 and include inputted/outputted between the electronic device and components outside the electronic device 200. For example, the memory 240 may store event information on the electronic device 200 detected by the sensor module 220 and rotation information on the first display screen or each of a plurality of objects included in the first display screen, which is determined by the processor 230. Examples of the memory 240 may include hard disk drive, read only memory (ROM), random access memory (RAM), flash memory, and memory card inside or outside the electronic device 200.

It is apparent to those skilled in the art that the display module 210, the sensing module 220, the processor 230, and the memory 240 may be implemented separately and at least one of them may be implemented integrally.

Figure 11A:
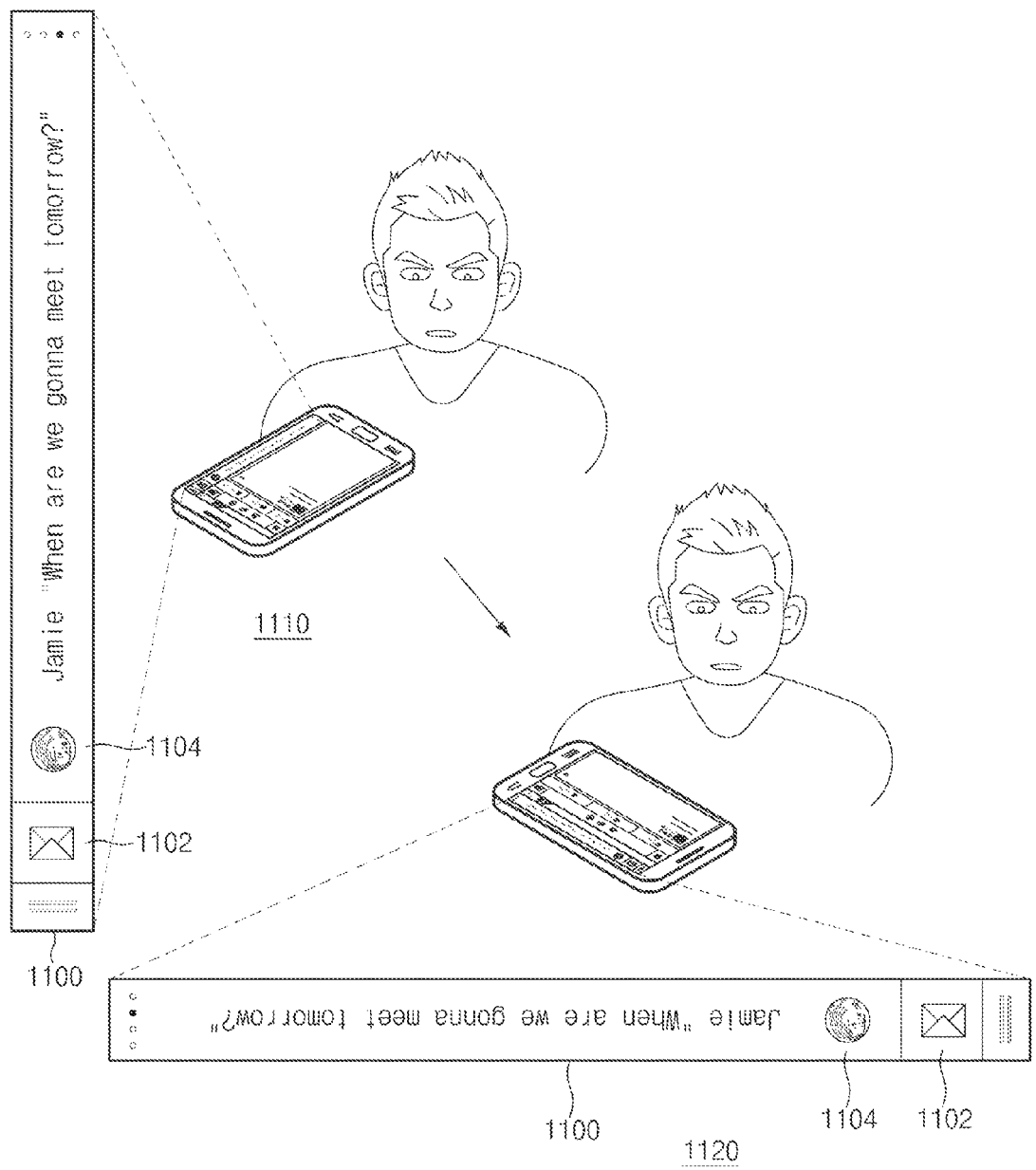
FIGS. 11A and 11B are views illustrating a type of an event corresponding to a rotation of an electronic device and a UI effect displayed based on the type according to an embodiments of the present disclosure.
Figure 11B:
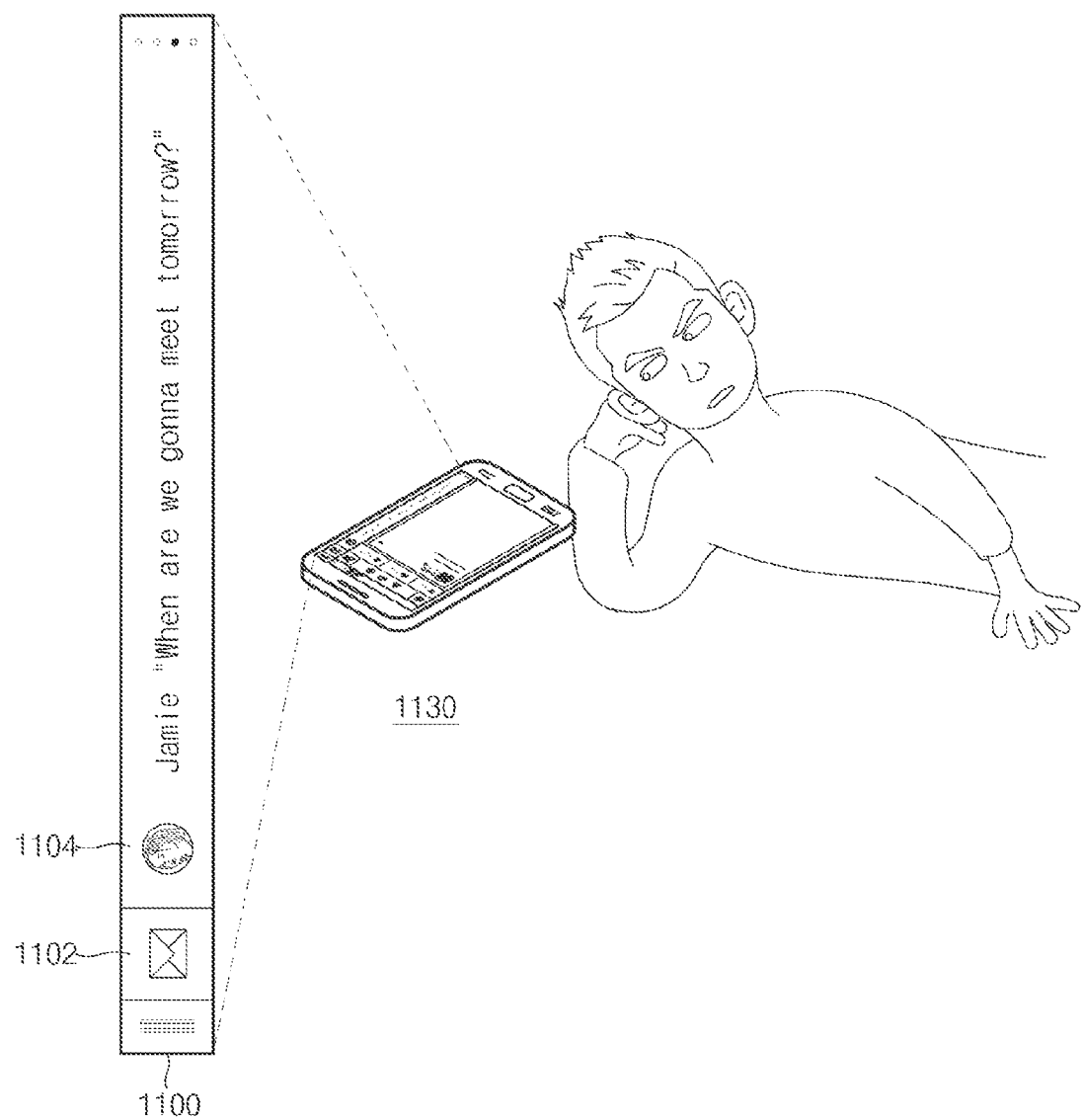

FIGS. 11A and 11B are views illustrating the type of an event corresponding to the rotation of an electronic device and an UI effect displayed based on the type according to various embodiments of the present disclosure.

Referring to FIGS. 11A and 11B, the electronic device 200 may display a first display screen 1100 on the first display 202. A plurality of objects including a first object 1102 and a second object 1104 may be displayed on the first display screen 1100.

Operation 1110 represents that a user puts down the electronic device 200 vertically and looks down at the electronic device 200. At this point, a text object included in the first display screen 1100 may be displayed horizontally along a long axis of the first display screen 1100. Additionally, the first object 1102 and the second object 1104 may be displayed horizontally along a short axis of the first display screen 1100. That is, the first object 1102 and the second object 1104 in the first display screen 1100 may be displayed toward the front of a user.

Operation 1120 represents that a user rotates the electronic device 200 horizontally and looks down at the electronic device 200. Referring to the first display screen 1100 in operation 1120, a text object is displayed horizontally along the major axis of the first display screen 1100. Additionally, in the same manner, the first object 1102 and the second object 1104 may be displayed horizontally along the major axis of the first display screen 1100. When the electronic device 200 is disposed horizontally, the first object 1102 and the second object 1104 need to be displayed horizontally along the major axis of the first display screen 1100, so that they are seen to a user in the front direction.

Operation 1130 represents that a user puts down the electronic device 200 vertically and looks down at the electronic device 200 as lying on the user's side. The electronic device 200 may detect the user's face by using an image sensor and an RGB sensor. In this case, the electronic device 200 may rotate the first object 1102 and the second object 1104 and may then display them based on a detection result on the user's face. For example, the electronic device 200 may rotate the first object 1102 and the second object 1104 and may then display them in order for a user to view the first object 1102 and the second object 1104 in the front direction.

Accordingly, even when the electronic device 200 rotates directly, the electronic device 200 may determine whether to rotate each of a plurality of objects by detecting a user's posture change, a user's face direction change, and a user's gaze change. For example, the electronic device 200 may determine whether to rotate each of a plurality of objects by detecting an angle formed by the vertical axis including the user's both eyes and the major axis of the first display 202.

Figure 12:
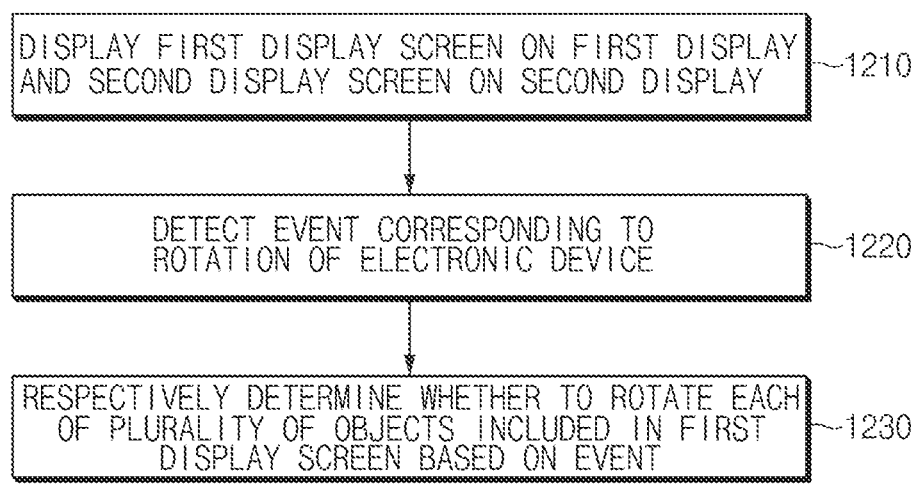
FIG. 12 is a flowchart illustrating a method of displaying a UI effect in an electronic device according to an embodiments of the present disclosure.

FIG. 12 is a flowchart illustrating a method of displaying an UI effect in an electronic device 200 according to various embodiments of the present disclosure.

The method of displaying an UI effect in the electronic device 200 according to an embodiment of FIG. 12 includes time-sequentially processed operations in the electronic device 200 according to various embodiments of FIGS. 1, 2A, 2B, 3A, 3B, 3C, 3D, 4, 5, 6A, 6B, 7A, 7B, 8A, 8B, 9A, 9B, 10A, 10B, 11A, and 11B. Accordingly, even if contents are omitted, contents described in relation to the electronic device of FIGS. 1 to 11 may be applied to the method of displaying an UI effect in the electronic device 200 according to the embodiment of FIG. 12.

In operation 1210, the electronic device 200 may display a first display screen on the first display 202 and a second display screen on the second display 204.

In operation 1220, the electronic device 200 may detect an event corresponding to the rotation of the electronic device 200. The event corresponding to the rotation of the electronic device 200 may include a rotation event of the electronic device 200 and a state change event such as a user's gaze and posture for the electronic device 200.

In operation 1230, the electronic device 200 may separately determine whether to rotate each of a plurality of objects included in the first display screen based on an event detected in operation 1220.

The order of operations 1210 to 1230 of FIG. 12 is just an example and thus present disclosure is not limited thereto. That is, the order between the above-mentioned operations may vary and some of the operations may be performed simultaneously. Additionally, the above mentioned operations may be repeated periodically at each predetermined time and may be performed again based on a user input.

An electronic device according to various embodiments of the present disclosure includes the first display and the second display; a display module displaying a first display screen on the first display and displaying a second display screen on the second display; a sensing module detecting an event corresponding to the rotation of the electronic device; and a processor separately determining whether to rotate each of a plurality of objects included in the first display screen.

The processor according to various embodiments of the present disclosure may determine whether to rotate the first display screen based on the event. Additionally, the processor may determine whether to rotate the second display screen based on the event. In this case, whether to rotate the first display screen and the second display screen may be determined separately.

According to various embodiments of the present disclosure, the second display screen and a plurality of objects included in the second display screen may rotate in the same direction based on the event.

According to various embodiments of the present disclosure, the object may include an image object and a text object.

According to various embodiments of the present disclosure, when the electronic device disposed in a vertical direction rotates to be disposed in a horizontal direction, the processor allows the image object to rotate and does not allow the text object to rotate. In this case, the image object may rotate 90 degrees in a clockwise direction. Additionally, the processor according to various embodiments of the present disclosure may determine whether to rotate the first display screen based on the rotation direction of the electronic device. At this point, when the electronic device rotates clockwise, the processor may allow the first display screen to rotate 180 degrees in a clockwise or counterclockwise direction.

The object according to various embodiments of the present disclosure may further include a page indicator object and the processor may not allow the page indicator object to rotate.

The first display screen according to various embodiments of the present disclosure rotates and is displayed during the rotation of the electronic device and the processor may allow a rotation angle of the first display screen to be proportional to a rotation angle of the electronic device.

During the rotation of the electronic device, the first display screen according to various embodiments of the present disclosure may fade in after fading out and may then be displayed.

During the rotation of the electronic device, the first display screen according to various embodiments of the present disclosure may be zoomed in after being zoomed out and may then be displayed.

During the rotation of the electronic device, the first display screen according to various embodiments of the present disclosure may rotate and may then be displayed based on the major axis of the first display screen during the rotation of the electronic device.

During the rotation of the electronic device, the first display screen according to various embodiments of the present disclosure may be scrolled in one direction of the first display screen and may then be displayed.

The sensing module according to various embodiments of the present disclosure may detect the rotation of the electronic device and a user's face direction for the electronic device. For example, the sensing module may detect an angle formed by the major axis of the first display screen and the vertical axis including the user's both eyes.

A method of displaying an UI effect according to various embodiments of the present disclosure includes displaying a first display screen on the first display and displaying a second display screen on the second display; detecting an event corresponding to the rotation of the electronic device; and separately determining whether to rotate each of a plurality of objects included in the first display screen.

An UI effect displaying method according to various embodiments of the present disclosure may further include determining whether to rotate the first display screen based on the event.

According to various embodiments of the present disclosure, whether to rotate the first display screen may be determined based on the rotation direction of the electronic device.

FIG. 13 is a block diagram illustrating an electronic device 1301 according to various embodiments of the present disclosure. The electronic device 1301, for example, may configure all or part of the above-mentioned electronic device 101 shown in FIG. 1. Referring to FIG. 13, the electronic device 1301 includes at least one application processor (AP) 1310, a communication module 1320, a subscriber identification module (SIM) card 1324, a memory 1330, a sensor module 1340, an input device 1350, a display 1360, an interface 1370, an audio module 1380, a camera module 1391, a power management module 1395, a battery 1396, an indicator 1397, and a motor 1396.

The AP 1310 may control a plurality of hardware or software components connected to the AP 1310 and also may perform various data processing and operations with multimedia data by executing an operating system or an application program. The AP 1310 may be implemented with a system on chip (SoC), for example. According to an embodiment of the present disclosure, the AP 1310 may further include a GPU (not shown).

The communication module 1320 (for example, the communication interface 160) may perform data transmission through a communication between other electronic devices (for example, the electronic device 104 or the server 106) connected to the electronic device 1301 (for example, the electronic devices 101) via a network. According to an embodiment of the present disclosure, the communication module 1320 may include a cellular module 1321, a Wifi module 1323, a BT module 1325, a GPS module 1327, an NFC module 1326, and a radio frequency (RF) module 1329.

The cellular module 1321 may provide voice calls, video calls, text services, or internet services through a communication network (for example, LTE, LTE-A, CDMA, WCDMA, UMTS, WiBro, or GSM). The cellular module 1321 may perform a distinction and authentication operation on an electronic device in a communication network by using a subscriber identification module (for example, the SIM card 1324), for example. According to an embodiment of the present disclosure, the cellular module 1321 may perform at least part of a function that the AP 1310 provides. For example, the cellular module 1321 may perform at least part of a multimedia control function.

According to an embodiment of the present disclosure, the cellular module 1321 may further include a communication processor (CP). Additionally, the cellular module 1321 may be implemented with SoC, for example. As shown in FIG. 13, components such as the cellular module 1321 (for example, a CP), the memory 1330, or the power management module 1395 are separated from the AP 1310, but according to an embodiment of the present disclosure, the AP 1310 may be implemented including some of the above-mentioned components (for example, the cellular module 1321).

According to an embodiment of the present disclosure, the AP 1310 or the cellular module 1321 (for example, a CP) may load instructions or data, which are received from a nonvolatile memory or at least one of other components connected thereto, into a volatile memory and then may process them. Furthermore, the AP 1310 or the cellular module 1321 may store data received from or generated by at least one of other components in a nonvolatile memory.

Each of the Wi-fi module 1323, the BT module 1325, the GPS module 1327, and the NFC module 1326 may include a processor for processing data transmitted/received through a corresponding module. Although the cellular module 1321, the Wifi module 1323, the BT module 1325, the GPS module 1327, and the NFC module 1326 are shown as separate blocks in FIG. 13, according to an embodiment of the present disclosure, some (for example, at least two) of the cellular module 1321, the Wifi module 1323, the BT module 1325, the GPS module 1327, and the NFC module 1326 may be included in one integrated chip (IC) or an IC package. For example, at least some (for example, a CP corresponding to the cellular module 1321 and a Wifi processor corresponding to the Wifi module 1323) of the cellular module 1325, the Wifi module 1327, the BT module 1326, the GPS module 1321, and the NFC module 1323 may be implemented with one SoC.

The RF module 1329 may be responsible for data transmission, for example, the transmission of an RF signal. Although not shown in the drawings, the RF module 1329 may include a transceiver, a power amp module (PAM), a frequency filter, or a low noise amplifier (LNA). Additionally, the RF module 1329 may further include components for transmitting/receiving electromagnetic waves on a free space in a wireless communication, for example, conductors or conducting wires. Although the cellular module 1321, the Wifi module 1323, the BT module 1325, the GPS module 1327, and the NFC module 1326 share one RF module 1329 shown in FIG. 13, according to an embodiment of the present disclosure, at least one of the cellular module 1321, the Wifi module 1323, the BT module 1325, the GPS module 1327, and the NFC module 1326 may perform the transmission of an RF signal through an additional RF module.

The SIM card 1324 may be a card including a subscriber identification module and may be inserted into a slot formed at a specific position of an electronic device. The SIM card 1324 may include unique identification information (for example, an integrated circuit card identifier (ICCID)) or subscriber information (for example, an international mobile subscriber identity (IMSI)).

The memory 1330 (for example, the memory 130) may include an internal memory 1332 or an external memory 1334. The internal memory 1332 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

According to an embodiment of the present disclosure, the internal memory 1332 may be a Solid State Drive (SSD). The external memory 1334 may further include flash drive, for example, compact flash (CF), secure digital (SD), micro secure digital (Micro-SD), mini secure digital (Mini-SD), extreme digital (xD), or memory stick. The external memory 1334 may be functionally connected to the electronic device 1301 through various interfaces. According to an embodiment of the present disclosure, the electronic device 1301 may further include a storage device (or a storage medium) such as a hard drive.

The sensor module 1340 measures physical quantities or detects an operating state of the electronic device 1301, thereby converting the measured or detected information into electrical signals. The sensor module 1340 may include at least one of a gesture sensor 1340A, a gyro sensor 1340B, a pressure sensor 1340C, a magnetic sensor 1340D, an acceleration sensor 1340E, a grip sensor 1340F, a proximity sensor 1340G, a color sensor 1340H (for example, a red, green, blue (RGB) sensor), a biology sensor 1340I, a temperature/humidity sensor 1340J, an illumination sensor 1340K, and an ultra violet (UV) sensor 1340M. Additionally/alternately, the sensor module 1340 may include an E-nose sensor (not shown), an electromyography (EMG) sensor, an electroencephalogram (EEG) sensor (not shown), an electrocardiogram (ECG) sensor (not shown), an infra red (IR) sensor (not shown), an iris sensor (not shown), or a fingerprint sensor (not shown). The sensor module 1340 may further include a control circuit for controlling at least one sensor therein.

The user input device 1350 may include a touch panel 1352, a (digital) pen sensor 1354, a key 1356, or an ultrasonic input device 1356. The touch panel 1352 may recognize a touch input through at least one of capacitive, resistive, infrared, or ultrasonic methods, for example. Additionally, the touch panel 1352 may further include a control circuit. In the case of the capacitive method, both direct touch and proximity recognition are possible. The touch panel 1352 may further include a tactile layer. In this case, the touch panel 1352 may provide a tactile response to a user.

The (digital) pen sensor 1354 may be implemented through a method similar or identical to that of receiving a user's touch input or an additional sheet for recognition. The key 1356 may include a physical button, a touch key, an optical key, or a keypad, for example. The ultrasonic input device 1356, as a device checking data by detecting sound waves through a microphone (for example, the microphone 1388) in the electronic device 1301, may provide wireless recognition through an input tool generating ultrasonic signals. According to an embodiment of the present disclosure, the electronic device 1301 may receive a user input from an external device (for example, a computer or a server) connected to the electronic device 200 through the communication module 1320.

The display 1360 (for example, the display 150) may include a panel 1362, a hologram device 1364, or a projector 1366. The panel 1362 may include a liquid-crystal display (LCD) or an active-matrix organic light-emitting diode (AM-OLED). The panel 1362 may be implemented to be flexible, transparent, or wearable, for example. The panel 1362 and the touch panel 1352 may be configured with one module. The hologram 1364 may show three-dimensional images in the air by using the interference of light. The projector 1366 may display an image by projecting light on a screen. The screen, for example, may be placed inside or outside the electronic device 1301. According to an embodiment of the present disclosure, the display 1360 may further include a control circuit for controlling the panel 1362, the hologram device 1364, or the projector 1366.

The interface 1370 may include a high-definition multimedia interface (HDMI) 1372, a universal serial bus (USB) 1374, an optical interface 1376, or a D-subminiature (sub) 1376, for example. The interface 1370 may be included in the communication interface 160 shown in FIG. 1, for example. Additionally/alternatively, the interface 1370 may include a mobile high-definition link (MHL) interface, a secure Digital (SD) card/multi-media card (MMC) interface, or an infrared data association (IrDA) standard interface.

The audio module 1380 may convert sound and electrical signals in both directions. At least some components of the audio module 1380 may be included in the input/output interface 140 shown in FIG. 1, for example. The audio module 1380 may process sound information inputted/outputted through a speaker 1382, a receiver 1384, an earphone 1386, or a microphone 1388.

The camera module 1391, as a device for capturing a still image and a video, may include at least one image sensor (for example, a front sensor or a rear sensor), a lens (not shown), an image signal processor (ISP) (not shown), or a flash (not shown) (for example, an light emitting diode (LED) or a xenon lamp).

The power management module 1395 may manage the power of the electronic device 1301. Although not shown in the drawings, the power management module 1395 may include a power management integrated circuit (PMIC), a charger integrated circuit (IC), or a battery or fuel gauge, for example.

The PMIC may be built in an IC or SoC semiconductor, for example. A charging method may be classified as a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 1396, or a voltage, current, or temperature of the battery 396 during charging. The battery 1396 may store or generate electricity and may supply power to the electronic device 1301 by using the stored or generated electricity. The battery 1396, for example, may include a rechargeable battery or a solar battery.

The indicator 1397 may display a specific state of the electronic device 1301 or part thereof (for example, the AP 1310), for example, a booting state, a message state, or a charging state. The motor 1396 may convert electrical signals into mechanical vibration. Although not shown in the drawings, the electronic device 1301 may include a processing device (for example, a GPU) for mobile TV support. A processing device for mobile TV support may process media data according to the standards such as digital multimedia broadcasting (DMB), digital video broadcasting (DVB), or media flow.

According to various embodiments of the present disclosure, based on an event detected by an electronic device, a predetermined UI effect may be displayed on a display of the electronic device. In this case, a displayed predetermined screen effect may improve user's convenience.

Each of the above-mentioned components of the electronic device according to various embodiments of the present disclosure may be configured with at least one component and the name of a corresponding component may vary according to the kind of an electronic device. An electronic device according to an embodiment of the present disclosure may be configured including at least one of the above-mentioned components or additional other components. Additionally, some of components in an electronic device according to an embodiment of the present disclosure are configured as one entity, so that functions of previous corresponding components are performed identically.

The term "module" used in this disclosure, for example, may mean a unit including a combination of at least one of hardware, software, and firmware. The term "module" and the term "unit", "logic", "logical block", "component", or "circuit" may be interchangeably used. "module" may be a minimum unit or part of an integrally configured component. "module" may be a minimum unit performing at least one function or part thereof "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, the at least one processor may perform a function corresponding to the instruction. The computer-readable storage media may include the memory 130, for example. At least part of a programming module may be implemented (for example, executed) by processor 120, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc Read Only Memory (CD-ROM) and DVD, Magneto-Optical Media such as Floptical Disk, and a hardware device especially configured to store and perform a program instruction (for example, a programming module) such as ROM, RAM, and flash memory. Additionally, a program instruction may include high-level language code executable by a computer using an interpreter in addition to machine code created by a complier. The hardware device may be configured to operate as at least one software module to perform an operation of this disclosure and vice versa.

A module of a programming module according to various embodiments may include at least one of the above-mentioned components or additional other components. Or, some programming modules may be omitted. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a display configured to include a first display screen and a second display screen;
a display module configured to display a first display screen on the display and a second display screen on the display, wherein the first display screen includes at least one first object and the second display screen includes at least one second object;
a sensing module configured to detect an event corresponding to a rotation of the electronic device; and a processor configured to determine whether to rotate the at least one first object included in the first display screen based on the event independently of a rest of the at least one first object and the at least one second object.

2. The electronic device according to claim 1, wherein the processor determines whether to rotate the first display screen based on the event.

3. The electronic device according to claim 2,
wherein the processor determines whether to rotate the second display screen based on the event; and
wherein whether to rotate the first display screen and whether to rotate the second display screen are determined differently from each other.

4. The electronic device according to claim 1, wherein the second display screen and the at least one second object included in the second display screen rotate in the same direction based on the event.

5. The electronic device according to claim 1, wherein the at least one first object and the at least one second object comprise an image object and a text object.

6. The electronic device according to claim 5, wherein if the electronic device disposed vertically rotates to be disposed horizontally, the processor rotates the image object and does not rotate the text object.

7. The electronic device according to claim 6, wherein the image object is determined to rotate 90 degrees in a clockwise direction.

8. The electronic device according to claim 6, wherein the processor determines whether to rotate the first display screen based on a rotation direction of the electronic device.

9. The electronic device according to claim 8, wherein if the electronic device rotates in a clockwise direction, the processor rotates the first display screen 180 degrees in a clockwise or counterclockwise direction.

10. The electronic device according to claim 6, wherein the object further comprises a page indicator object and the processor does not rotate the page indicator object.

11. The electronic device according to claim 9, wherein the first display screen is rotated during a rotation process of the electronic device, and the processor determines a rotation angle of the first display screen to be proportional to a rotation angle of the electronic device.

12. The electronic device according to claim 9, wherein the first display screen fades in after fading out during a rotation process of the electronic device.

13. The electronic device according to claim 9, wherein the first display screen is zoomed in after being zoomed out during a rotation process of the electronic device.

14. The electronic device according to claim 9, wherein the first display screen rotates based on a major axis of the first display screen during a rotation process of the electronic device.

15. The electronic device according to claim 9, wherein the first display screen is scrolled in one direction of the first display screen during a rotation process of the electronic device.

16. The electronic device according to claim 1, wherein the sensing module detects a rotation of the electronic device or a user's face direction with respect to the electronic device.

17. The electronic device according to claim 16, wherein the sensing module detects an angle formed by a longitudinal axis of the first display screen and a vertical axis formed by a direction of a gaze of the user's eyes.

18. A method of displaying a user interface (UI) effect, the method comprising:
displaying a first display screen and a second display screen, wherein the first display screen includes at least one first object and the second display screen includes at least one second object;
detecting an event corresponding to a rotation of an electronic device; and
determining whether to rotate each of the at least first object included in the first display screen based on the event independently of a rest of the at least one first object and the at least one second object.

19. The method according to claim 18, further comprising:
rotating the at least one first object included in the first display screen according to a result of the determination.

20. The method according to claim 18, further comprising:
determining whether to rotate the at least one second object included in the second display screen; and
rotating the at least one second object included in the second display screen according to a result of the determination.

* * * * *